US011816082B2

(12) United States Patent
Tidwell et al.

(10) Patent No.: US 11,816,082 B2
(45) Date of Patent: *Nov. 14, 2023

(54) SEARCHABLE INVESTIGATION HISTORY FOR EVENT DATA STORE

(71) Applicant: Sumo Logic, Inc., Redwood City, CA (US)

(72) Inventors: Kenny Tidwell, Los Altos, CA (US); David Frampton, Portola Valley, CA (US); Brendan O'Connell, Sandown, NH (US)

(73) Assignee: Sumo Logic, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,721

(22) Filed: May 10, 2022

(65) Prior Publication Data

US 2022/0300473 A1     Sep. 22, 2022

Related U.S. Application Data

(63) Continuation of application No. 16/656,448, filed on Oct. 17, 2019, now Pat. No. 11,360,957, which is a
(Continued)

(51) Int. Cl.
*G06F 16/22* (2019.01)
*G06F 16/245* (2019.01)
(Continued)

(52) U.S. Cl.
CPC .......... *G06F 16/2228* (2019.01); *G06F 11/30* (2013.01); *G06F 16/245* (2019.01);
(Continued)

(58) Field of Classification Search
CPC .. G06F 16/2228; G06F 16/245; G06F 16/282; G06F 11/30; G06F 21/00;
(Continued)

(56) References Cited

U.S. PATENT DOCUMENTS 7,873,717 B1    1/2011  Woolway
8,055,638 B2   11/2011  Schechter et al.
(Continued)

FOREIGN PATENT DOCUMENTS

EP              3455748 A1    3/2019
EP              3455748 B1    4/2021
WO      WO-2017196815 A1    11/2017

OTHER PUBLICATIONS

"U.S. Appl. No. 15/150,131, 312 Amendment filed Oct. 16, 2019", 9 pgs.
(Continued)

*Primary Examiner* — Cam Linh T Nguyen
(74) *Attorney, Agent, or Firm* — Schwegman Lundberg & Woessner, P.A.

(57) ABSTRACT

A processing device receives a first query comprising a first field value and a first time period. The processing device performs a first search of a data store to identify a first plurality of events having the first time period and at least one field that comprises the first field value. The processing device generates a first search object comprising the first field value. The processing device generates a search event comprising the first field value and a reference to the first search object. An event entry for the first search event is then written to the data store. Future searches may return both the first search event and other events.

20 Claims, 12 Drawing Sheets

Related U.S. Application Data continuation of application No. 15/150,131, filed on May 9, 2016, now Pat. No. 10,515,062.

(51) Int. Cl.
| | | |
|---|---|---|
| *G06F 16/28* | (2019.01) | |
| *G06F 11/30* | (2006.01) | |
| *G06F 21/55* | (2013.01) | |
| *H04L 9/40* | (2022.01) | |
| *G06F 21/00* | (2013.01) | |
| *G06Q 10/10* | (2023.01) | |

(52) U.S. Cl.
CPC ............ *G06F 16/282* (2019.01); *G06F 21/00* (2013.01); *G06F 21/55* (2013.01); *G06F 21/552* (2013.01); *G06F 21/554* (2013.01); *G06Q 10/10* (2013.01); *H04L 63/1416* (2013.01)

(58) Field of Classification Search
CPC ...... G06F 21/55; G06F 21/552; G06F 21/554; G06Q 10/10; H04L 63/1416
USPC .......................................................... 707/741
See application file for complete search history.

(56) References Cited

U.S. PATENT DOCUMENTS

| | | | |
|---|---|---|---|
| 8,918,401 B1 | 12/2014 | Marmaros et al. | |
| 9,111,284 B2 | 8/2015 | Noirot-nerin | |
| 9,363,149 B1 | 6/2016 | Chauhan et al. | |
| 10,235,417 B1 | 3/2019 | Sterin et al. | |
| 10,515,062 B2 | 12/2019 | Tidwell et al. | |
| 2005/0273453 A1 | 12/2005 | Holloran | |
| 2010/0100546 A1* | 4/2010 | Kohler ................... G06F 16/40 | |
| | | | 707/739 |
| 2010/0175006 A1 | 7/2010 | Li | |
| 2010/0198858 A1* | 8/2010 | Edwards ................ G06Q 50/26 | |
| | | | 707/769 |
| 2011/0112974 A1* | 5/2011 | Hinton ................. G06Q 30/018 | |
| | | | 705/317 |
| 2013/0091574 A1 | 4/2013 | Howes et al. | |
| 2014/0013434 A1 | 1/2014 | Ranum et al. | |
| 2014/0165140 A1 | 6/2014 | Singla et al. | |
| 2015/0127601 A1 | 5/2015 | Mcgill et al. | |
| 2015/0207813 A1* | 7/2015 | Reybok ................. H04L 63/145 | |
| | | | 726/22 |
| 2015/0295779 A1 | 10/2015 | Ching et al. | |
| 2016/0063070 A1 | 3/2016 | Benum | |
| 2016/0246849 A1 | 8/2016 | Frampton et al. | |
| 2017/0011127 A1 | 1/2017 | Hu et al. | |
| 2017/0236229 A1* | 8/2017 | Roof ...................... G06Q 50/26 | |
| | | | 705/345 |
| 2017/0277887 A1 | 9/2017 | Ijiro et al. | |
| 2017/0322959 A1 | 11/2017 | Tidwell et al. | |
| 2020/0050594 A1 | 2/2020 | Tidwell et al. | |

OTHER PUBLICATIONS

"U.S. Appl. No. 15/150,131, Corrected Notice of Allowability dated Nov. 29, 2019", 2 pgs.

"U.S. Appl. No. 15/150,131, Examiner Interview Summary dated Jun. 11, 2019", 3 pgs.

"U.S. Appl. No. 15/150,131, Non Final Office Action dated Sep. 19, 2019", 10 pgs.

"U.S. Appl. No. 15/150,131, Notice of Allowance dated Jul. 17, 2019", 9 pgs.

"U.S. Appl. No. 15/150,131, PTO Response to Rule 312 Communication dated Oct. 31, 2019", 2 pgs.

"U.S. Appl. No. 15/150,131, Response filed Jun. 18, 2019 to Non Final Office Action dated Sep. 19, 2019", 10 pgs.

"U.S. Appl. No. 16/656,448, Corrected Notice of Allowability dated Mar. 3, 2022", 2 pgs.

"U.S. Appl. No. 16/656,448, Examiner Interview Summary dated Aug. 4, 2021", 2 pgs.

"U.S. Appl. No. 16/656,448, Final Office Action dated Oct. 14, 2021", 15 pgs.

"U.S. Appl. No. 16/656,448, Non Final Office Action dated May 12, 2021", 13 pgs.

"U.S. Appl. No. 16/656,448, Notice of Allowance dated Feb. 16, 2022", 8 pgs.

"U.S. Appl. No. 16/656,448, Response filed Aug. 6, 2021 to Non Final Office Action dated May 12, 2021", 12 pgs.

"U.S. Appl. No. 16/656,448, Response filed Dec. 14, 2021 to Final Office Action dated Oct. 14, 2021", 14 pgs.

"European Application Serial No. 17796672.8, Extended European Search Report dated Nov. 4, 2019", 8 pgs.

"European Application Serial No. 17796672.8, Intention to Grant dated Nov. 20, 2020", 6 pgs.

"European Application Serial No. 17796672.8, Response filed May 29, 2020 to Extended European Search Report dated Nov. 4, 2019", 18 pgs.

"International Application Serial No. PCT/US2017/031710, International Preliminary Report on Patentability dated Nov. 22, 2018", 7 pgs.

"International Application Serial No. PCT/US2017/031710, International Search Report dated Jul. 17, 2017", 2 pgs.

"International Application Serial No. PCT/US2017/031710, Written Opinion dated Jul. 17, 2017", 5 pgs.

* cited by examiner

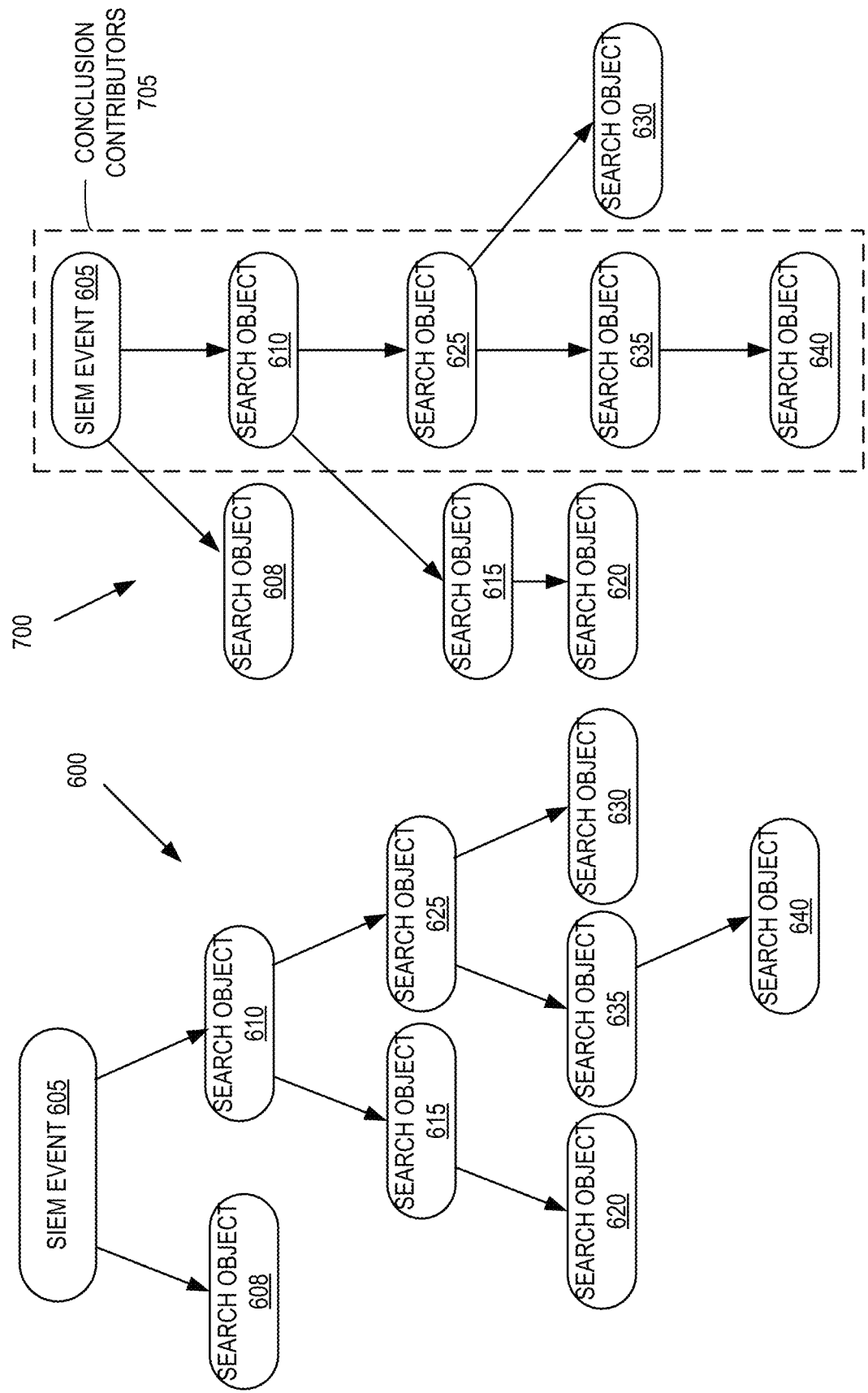

SEARCHABLE INVESTIGATION HISTORY FOR EVENT DATA STORE

CROSS-REFERENCE TO RELATED APPLICATIONS

This application is a Continuation application under 35 USC § 120 of U.S. patent application Ser. No. 16/656,448, entitled "Searchable Investigation History for Event Data Store," filed on Oct. 17, 2019, which is a Continuation Application of U.S. Pat. No. 10,515,062, entitled "Searchable Investigation History for Event Data Store," filed May 9, 2016, all of which are incorporated herein by reference in their entirety.

TECHNICAL FIELD

Embodiments of the present invention relate, in general, to the fields of security information management (SIM) and security event management (SEM), and more particularly to a system that stores and searches search events and other events in an event data store.

BACKGROUND

A defensible cyber security posture for a party may mean that the party has deployed systems designed to detect and respond to threats. There are numerous types of systems including those within categories such as firewalls, intrusion detection systems, antivirus systems, malware protection systems, and threat reputation systems. When these systems detect a potential security issue, an alert or alarm is generated to call attention from an operator.

A large number of alerts are typically generated because very large numbers of generic and targeted attacks affect enterprises. Oftentimes so many alerts are generated that operators cannot keep up with the number of alerts. For well-tuned, high investment environments, an enterprise may see an average of 500 alerts per week. Other enterprises may see around 5000 alerts per week across all security systems of those enterprises.

An average alert response typically requires a minimum of 1 hour with some requiring much more time depending on complexity. An average full time security analyst may process 15-20 alerts per week. The gap, between how many alerts security systems generate and how many a customer can process, is large and growing. Those unprocessed alerts represent heightened risk to the enterprises.

Additionally, multiple different security analysts may investigate the same alerts or different alerts that converge on the same root problem without any knowledge that others are working on the same or similar investigations. Moreover, a security analyst may investigate a first alert and then shortly thereafter that security analyst or another security analyst may investigate a second similar alert. However, in conventional systems there is no mechanism to enable the investigation of the second alert to leverage the previous investigation of the first alert.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 6 illustrates an example investigation history, in accordance with embodiments.

FIG. 7 illustrates an example resolved investigation, in accordance with embodiments.

DETAILED DESCRIPTION

Figure 1:
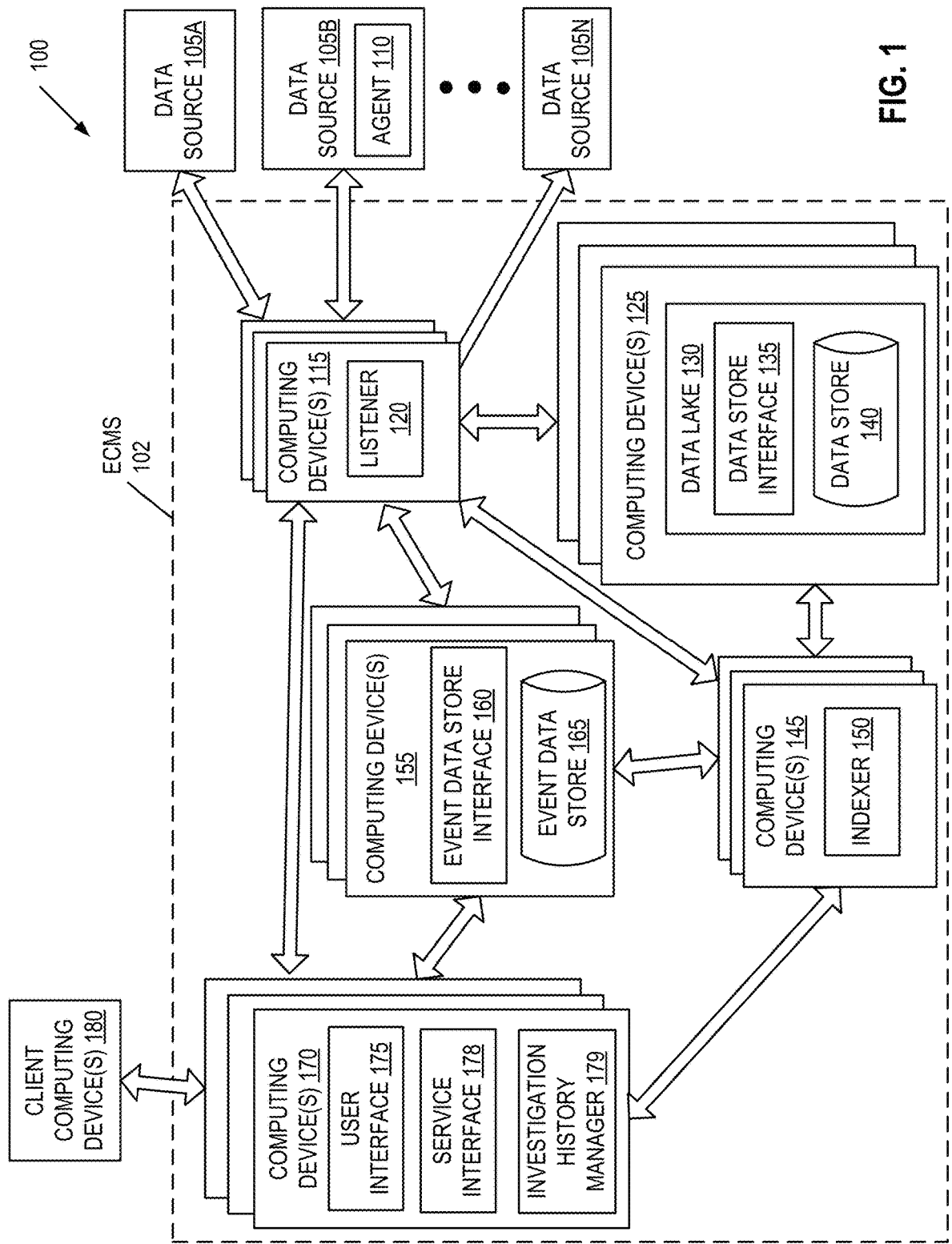
FIG. 1 is a block diagram depicting an example network architecture for an event context management system.

Embodiments are directed to an event context management system (ECMS) that stores search events in a data base together with events that are searched. The search events may be stored and searched using the same infrastructure that is used to store and search standard events based on log entries. Accordingly, when a user performs a search of events, the returned results may include standard events based on log entries as well as previous search events associated with previous searches that have been performed and that have similar search criteria to a current search. The user may then review the previous search and/or results of the previous search to determine if the user is duplicating efforts or if a current incident is similar to a previous incident that was already resolved.

The ECMS may receive streams of log data (e.g., device logs and application logs) from many sources, convert log entries from the log data into events, and store the events in an event data store based on fields specified in source type definitions (also referred to herein simply as source types). Each event represents a particular log entry. The events that are stored in the data store may be based on log entries from various sources and may have different formats. Examples of log entries include simple network management protocol (SNMP) logs, reports from devices and/or applications running on devices, application programming interface (API) call records, information exchange protocols, remote authentication dial-in user service (RADIUS) logs, lightweight directory access protocol (LDAP) logs, security assertion markup language (SAML) messages, and so forth. These diverse events may all be stored and indexed in the event data store, which may be a non-homogenous database, in a manner that enables the events to be searched and linked together.

In embodiments, a processing device receives a first query comprising one or more field values and a first time period. The processing device performs a first search of a data store to identify a first set of events having times that fall within the first time period and that have the one or more field values. The processing device generates a search object that includes the searched field values and a search object identifier (ID) and then stores the search object in the data store. The processing device additionally generates a search event that includes the searched field values and a reference to the search object. The reference may be a field that includes the search object identifier. The processing device writes a separate entry for the search event into the data store for each of the searched field values. Each entry may be indexed on one of the searched field values.

When a second query is received (e.g., from a different user than the one who provided the first query), that second query may include a second time period that is close to or the same as the first time period and some or all of the field values that were searched in the first search. The processing device performs a second search of the data store to identify a second set of events having times that fall within the second time period and that have the newly searched field values. The second set of events may include the search event that was generated for the first search along with events that were generated based on log entries. Accordingly, the first search is captured in the second search. This enables a user that performed the second search to review a previous investigation associated with the first search. The ability to review the previous search may minimize or eliminate duplicate efforts in cases where two investigations are associated with the same incident or alert.

Note that embodiments herein are described in relation to a raw data stream. The term "raw data stream" is used to refer to a data stream that contains "raw log data". The term "raw log data" is used to refer to log data that has not yet been prepared or organized for the generation of events and that contains an unknown number of partial and/or complete log entries. The raw log data may or may not be originally formatted data. Accordingly, the data stream referred to as a "raw" data stream may or may not contain actual originally formatted data. In some instances, a sender of the raw data stream may perform one or more operations on the raw data stream prior to sending it to cause the raw data stream to not have a perfect representation of an original format. Accordingly, a raw data stream may have contents that have not yet been modified or have been minimally modified by the ECMS.

Referring now to the figures, FIG. 1 is a block diagram depicting an example distributed network architecture 100 for an event context management system (ECMS) 102, in accordance with some embodiments. The ECMS 102 in one embodiment includes multiple computing devices 115, 125, 145, 155, 170, each of which executes different components of the ECMS 102. One or more computing devices 115 include instances of a listener 120. One or more computing devices 125 include instances of a data lake 130. One or more computing devices 145 include instances of an indexer 150. One or more computing devices 155 include instances of an event data store interface 160 and/or an event data store 165. One or more computing devices 170 include instances of a user interface 175, a service interface 178 and/or a investigation history manager 179. In alternative embodiments, one or more of the listener 120, data lake 130, indexer 150, event data store 165, user interface 175, investigation history manager 179 and/or service interface 178 may execute on a single machine. For example, each of these components may execute on one machine. In another example, some components may execute on a first machine and other components may execute on a second machine. Accordingly, many different configurations of the ECMS 102 are possible.

Computing devices 115, 125, 145, 155, 170 may be hardware computing devices that include physical machines and/or virtual machines hosted by physical machines. The physical machines may be rackmount servers, desktop computers, blade servers, or other computing devices. In one embodiment, at least one of the computing devices 115, 125, 145, 155, 170 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

One or more computing devices 115 may be arranged in a cluster. Similarly, one or more computing devices 125 may be arranged in a cluster, one or more computing devices 145 may be arranged in a cluster, one or more computing devices 155 may be arranged in a cluster and one or more computing devices 170 may be arranged in a cluster. The clusters may provide load balancing, high availability functionality, failover functionality, and so on. In instances where the computing devices are virtual machines, additional computing devices may be instantiated with appropriate components of the ECMS 102 as load increases. Similarly, virtual machines may be terminated as load on particular components of the ECMS 102 decreases.

The various computing devices 115, 125, 145, 155, 170 may be connected via one or more networks, which may include a local area network (LAN), a wide area network (WAN) such as the Internet, and or a combination thereof. Additionally, computing devices 115 may be connected to one or more data sources 105A, 105B through 105N via one or more networks. Client computing devices 180 and/or third-party computing devices 182 executing third party services 185 may be connected to computing devices 170 via one or more networks.

Data sources 105A-N are providers of raw data streams of log data. Data sources 105A-N may be devices in an enterprise environment (e.g., on a network of an enterprise) that produce log data. Examples of such devices include computing devices (e.g., server computing devices) that generate system logs, firewalls, routers, identity management systems, switches, and so on. Data sources 105A-N may also include applications, services, modules, etc. that generate log data. The log data in the raw data streams may differ between data sources 105A-N. Examples of log data formats include Syslog messages, simple network management protocol (SNMP) logs, reports from devices and/or applications running on devices, application programming interface (API) call records, information exchange protocols, remote authentication dial-in user service (RADIUS) logs, lightweight directory access protocol (LDAP) logs, security assertion markup language (SAML) messages, and so forth.

The mechanism of receiving the raw data streams may differ between data sources 105A-N. In some instances, a data source 105A-N establishes a connection to listener 120 using a particular port and internet protocol (IP) address.

Connections may be made, for example, using transmission control protocol (TCP) or user datagram protocol (UDP). For example, if TCP is used then the data source 105A-N may send hypertext transport protocol (HTTP) and/or HTTP over secure socket layer (HTTPS) messages. If standard HTTP or UDP are used to send a raw data stream, then the data source 105A-N may encrypt the raw data stream before sending to secure log data in the raw data stream. Listener 120 may then decrypt the raw data stream on receipt.

For some data sources 105A-N, the listener 120 periodically queries the data source 105A-N for the raw data stream containing the log data. For example, data source 105N may include an account of a third-party service such Salesforce.com®, DropBox®, Box®, and so on. In such an instance, listener 120 uses provided account credentials to log into an account of a customer and query the third-party service for log data.

Some data sources such as data source 105B may not include a native capability to send log data to listener 120 via either a push model or a pull model. In such instances, an agent 110 may be installed on the data source 105B. The agent 110 may collect log data from the data source 105B and may send a raw data stream containing the log data to listener 120. For example, agent 110 may scan directories and/or files on a device to generate log data (e.g., identifying file contents in the directories and/or information about scanned files), and may then send that log data to listener 120. In another example, agent 110 may scan commit logs of a database, may generate pseudo log entries from the commit logs, and may send the pseudo log entries to listener 120. In one embodiment, agent 110 encrypts log data before sending it to listener 120. Alternatively, or additionally, agent 110 may receive a raw data stream from the data source 105B via UDP and may then send the raw data stream to listener 120 via TCP. Accordingly, agent 110 may provide additional mechanisms and/or protocols not natively supported by data source 105A to enable data source 105A to send log data using those mechanisms and/or protocols.

In some embodiments, the agent 110 records metadata indicating the data source 105A, such as names of files and/or file paths that data is collected from, names of directories that data is collected from, ports at which the agent received log data, IP addresses from which the agent 110 received log data, and so on. The provided metadata may later be used by the listener 120 to identify a data source. For example, if an agent 110 receives log data from multiple different data sources, that agent 110 may record metadata associated with each of those data sources to enable the listener 120 to distinguish between raw data streams from those two data sources. In another example, agent 110 may scan directories for log files, and may find multiple different log files all having different log formats. By transmitting information about the particular log files, agent 110 may enable the listener 120 to determine each of those log formats.

In some instances, enterprises may be configured to collect log data for third party systems such as SIEMs. In such an embodiment, the enterprises may additionally send the log data to listener 120. Alternatively, or additionally, listener 120 may receive the log data directly from the SIEMs. Such log data may be received before and/or after the SIEMs operate on the log data.

Listener 120 is a component of the ECMS 102 that receives raw data streams and writes the raw data streams to a data lake 130. Listener 120 listens for raw data streams from many different data sources 105A-N. Listener 120 creates a separate raw data stream record in the data lake 130 for each data source, and writes the raw data stream from that data source 105A-N into the appropriate raw data stream record. Each raw data stream may be a constant or periodic stream of data. For example, some data streams may be sent once a day at a particular time. Other data streams may be sent as new data becomes available. Data streams may also be received at other regular or non-regular periodicity.

Data lake 130 is a large object-based data store 135 accompanied by a processing engine (data store interface 135) to operate on data in the data store 135. Data lake 130 may be capable of storing and operating on any type of data, regardless of a format of that data. Data lake 130 stores data such as raw data streams in a native format of the data. Examples of data lakes include Azure Data Lake®, Kafka®, Rabbit MQ®, and Hadoop®. Data store interface 135 receives read and write requests, and performs reads to the data store 140 and writes from the data store 140 responsive to those read and write requests. For example, data store interface 135 may receive write requests from listener 120 to write messages containing log data of a raw data stream to a raw data stream record. Data store interface 135 may also respond to read and write requests from indexer 150.

Indexer 150 reads log data from the data lake 130, generates events from the log data, and writes those events to event data store 165. Responsive to reading log data from a raw data stream record in the data lake 130, indexer 150 may break the log data into discrete log entries, and write those discrete log entries to a corrected data stream record in the data lake 130. Indexer 145 may then read discrete log entries from the corrected data stream record, and determine fields of the discrete log entry to be used as link keys and/or index keys for that log entry. The indexer 145 generates an event for that discrete log entry, and writes a separate instance of the event to the event data store 165 for each determined link key or index key. The number of fields and selection of specific fields of the log entry to use as link keys and/or index keys may vary from event to event based on log format and/or a source type of a data source that the log entry was received from. Each field designated as a link key and/or index key may be used to index the event in the event data store.

Event data store 165 is a data store used to store events. In one embodiment, event data store 165 is a database other than a relational database (e.g., a NoSQL database). In one embodiment, event data store 165 is implemented using a NoSQL database that uses a key-value store, a document store, and/or a wide column store. Examples of NoSQL databases that may be used for the data store 165 include Apache Casandra®, MongoDB®, and Redis®. However, many other types of NoSQL databases may alternatively be used. Event data store interface 160 executes queries to search the event data store 165 and executes write requests to write to the event data store 165. The write requests may be received, for example, from indexer 150, investigation history manager 179 and/or listener 120. The queries may be received, for example, from listener 120, user interface 175 and/or service interface 178.

User interface 175 may be a web interface that users may access from client computing devices 180. For example, user interface 175 may be a web server that serves web pages, and client computing devices 180 may execute web browsers that interface with the user interface 175. Via the user interface 175, users may request queries to the event data store 165. A query may include one or more field values, identification of one or more fields or field types associated with the field values, and/or a time period.

Responsive to receiving request from a client computing device 180, user interface 175 generates a query and sends the query to event data store interface 160. Event data store interface 160 then searches the event data store and returns results to user interface 175. User interface 175 then analyzes the data, consolidates it, generates a report, and sends the report to the client computing device 180.

Service interface 178 performs similar operations to those of user interface 175, but interfaces with third party services 185 rather than users. Examples of such third-party services include SIEM services such as HP Arcsight®, Novell NetIQ®, IBM Q1 Labs®, Quest®, Splunk®, and so on. Service interface 178 may receive a query request from a third-party service 185, and may issue a query to the event data store 165 in a similar manner as described with reference to the user interface 175. The service interface 178 may then generate a response to the initial request from the third-party service 185 in accordance with the type of information requested by the third-party service 185. Additionally, service interface may determine a format for responding to the third-party service 185, and may format the response in accordance with the determined format.

Investigation history manager 179 is responsible for recording queries or searches in the event data store in a manner that enables the queries or searches to be searched using the same functionality that is used to search for events. Each time a query is received by user interface 175 or service interface 178, investigation history manager 179 generates a search object and/or a search event based on the query. The search object and/or search event may be stored in the event data store 165, and may contain information about the query such as the field values searched, a time period searched, a time that the search was performed, and so on.

Figure 2:
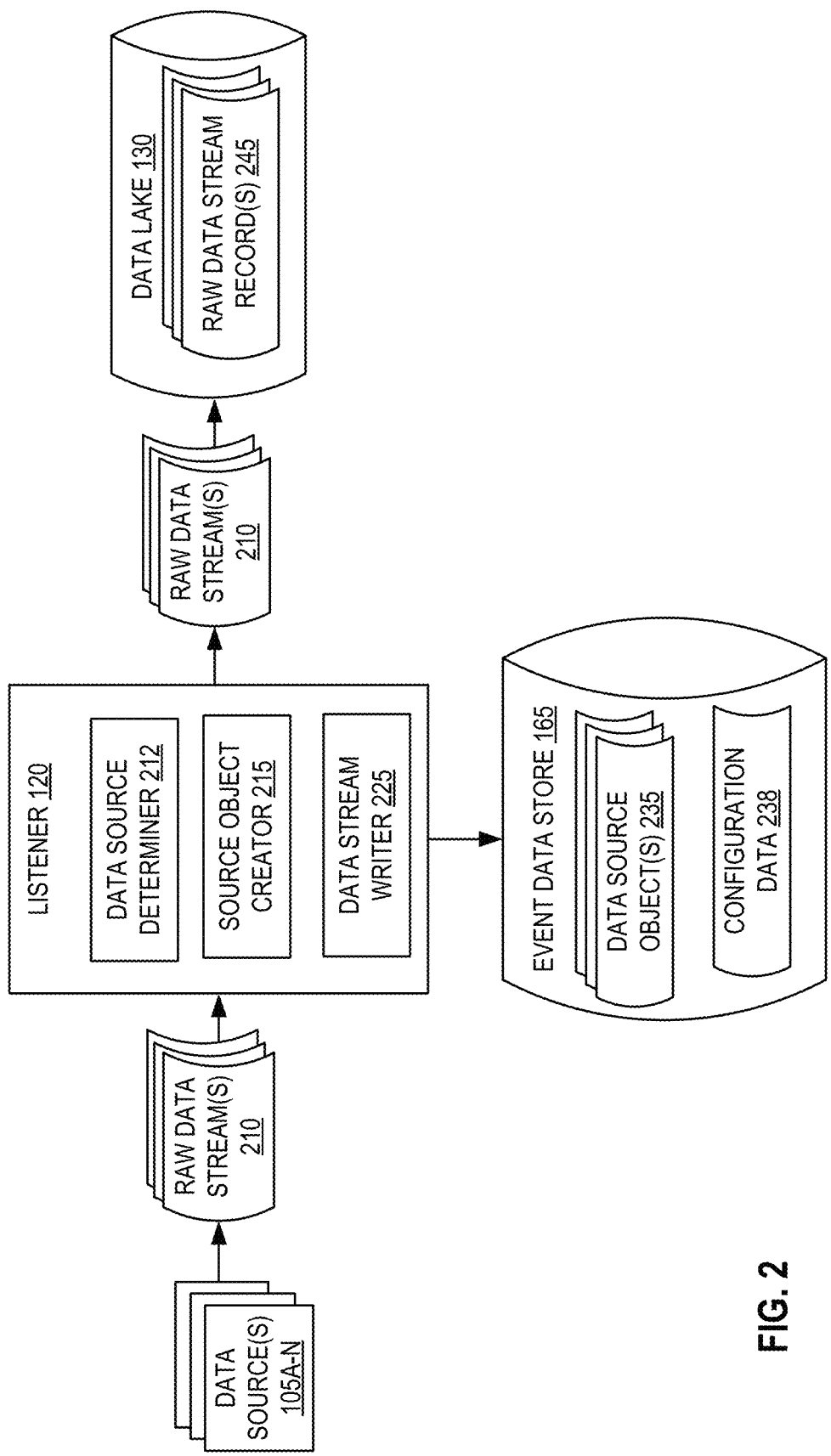
FIG. 2 is a block diagram of a listener of an event context management system, in accordance with embodiments.

FIG. 2 is a block diagram of a listener 120 of an event context management system. In one embodiment, listener 120 includes a data source determiner 212, a source object creator 215 and a data stream writer 225. Alternatively, the functionality of the data source determiner 212, source object creator 215 and/or data stream writer 225 may be combined into a single module or divided into multiple modules. Moreover, multiple instances of the source object creator 215 and/or data stream writer 225 may be instantiated in listener 120.

Listener 120 receives raw data streams 210 from multiple different data sources 105A-N. The raw data streams 210 may each include one or more messages, where each message includes anywhere from a part of a single log entry to many log entries. The raw data stream 210 may include one line of data or multiple lines of data that arrive in a single flow of data. The different raw data streams 210 are initial data streams that may include log data of various different formats. However, it can be assumed that all log data from a single data source will have the same log format.

The log data received in the raw data streams 210 may be data that has been generated from native sources. Examples of log data include Syslog entries, simple network management protocol (SNMP) logs, reports from one or more systems, logs of application programming interface (API) calls, logs associated with information exchange protocols, remote authentication dial-in user service (RADIUS) logs, lightweight directory access protocol (LDAP) logs, security assertion markup language (SAML) logs, and so on.

Responsive to receipt of a raw data stream 210, data source determiner 212 determines a data source 105A-N from which the raw data stream 210 was received. As discussed above, the raw data streams may be received in many ways. For example, raw data streams may be pushed by data sources via UDP or TCP, may be pulled from data sources via UDP or TCP, may be received based on using uniform resource locators (URLs) to access third party services (e.g., Salesforce.com®, Dropbox®, etc.) using HTTP requests, may be retrieved from directories or files, may be received from agents, and so on. Data source determiner 212 uses information on how the raw data stream 210 arrived at the listener 120 and where the raw data stream 210 came from to determine the data source 105A-N that the raw data stream 210 was received from.

In a first example, one or more data streams may be received via UDP or TCP at a particular port of the listener 120. If multiple data streams are received at the same port, then the IP addresses of the sender may be used to distinguish between data sources. A combination of the sender IP address and the port at which the data stream is received may be used to distinguish data sources. For example, a stream received at a particular port from a particular IP range may be from a first data source that sends firewall logs, and a stream received at a port from another IP range may be from a second data source that sends domain name system (DNS) logs. In a second example, the data stream may be data retrieved from a particular URL. In a third example, the data stream may be log data collected from a particular directory having a directory name and/or file having a file name and file type. The IP addresses and/or ports, host names, URLs, file names, file types, file paths, directory names, delivery method and/or other information may be used to identify a particular data source 105A-N.

Once the data source 105A-N is identified, if the data source 105A-N is a new data source data source determiner 212 attempts to determine a source type associated with the new data source. Data source determiner 212 may use the information on where the raw data stream came from and how the raw data stream arrived at the listener 120 to perform a lookup in configuration data 238. For example, port data and/or IP address data associated with the raw data stream 210 may be used to perform a lookup in the configuration data 238.

Figure 5:
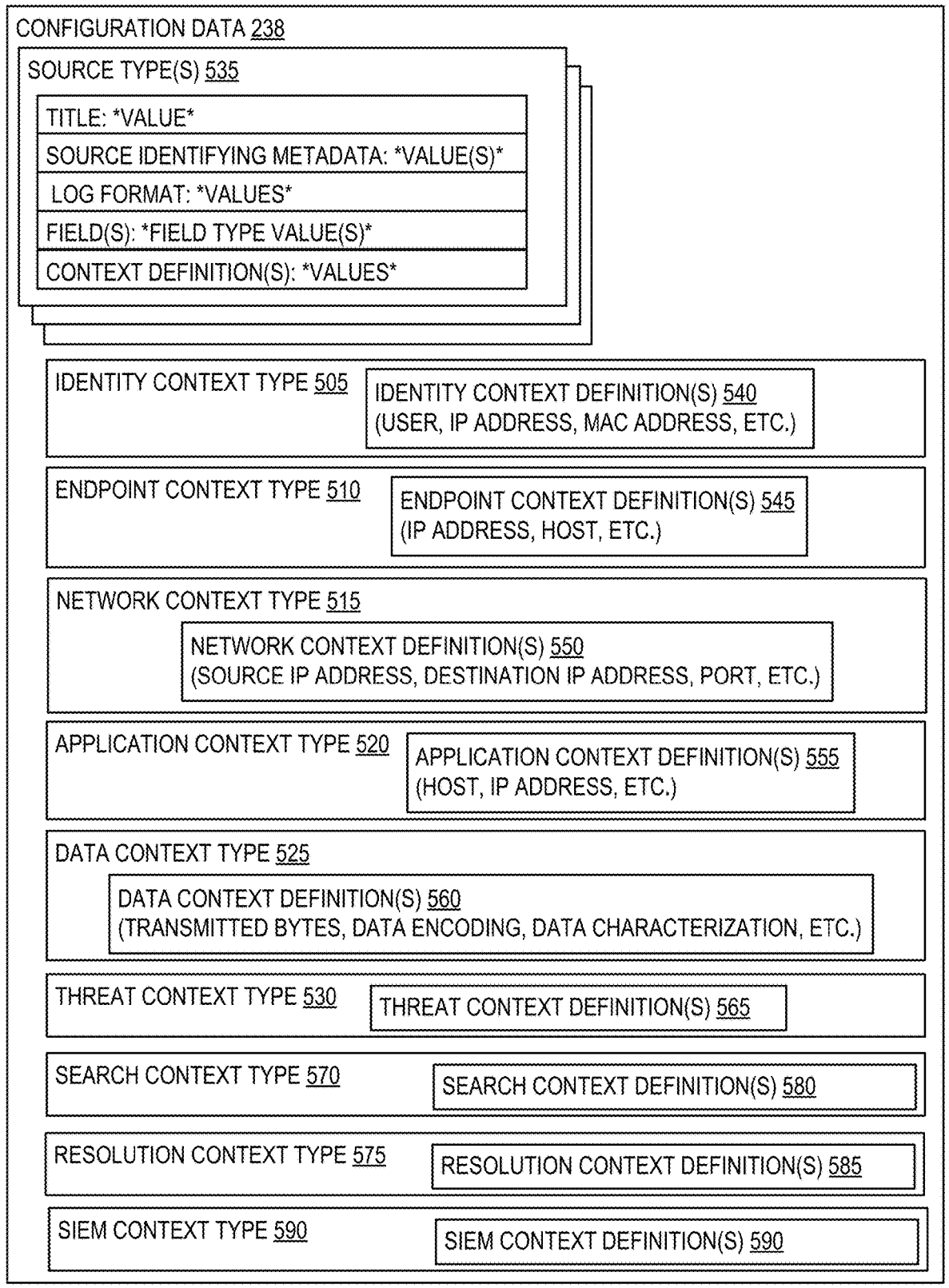
FIG. 5 is a block diagram of sample configuration data for an event context management system.

The configuration data 238 may include entries for multiple different source types. Each entry may include information identifying one or more log formats based on data sources, how data is received from the data sources, and how the data arrives at the listener 120. For example, a particular source type may include an entry identifying particular IP address(es) and/or port(s) associated with the source type. In this example, raw data streams received from the particular IP address and at the particular port number may be identified as having the particular source type. A source type may additionally include a definition of a log format, one or more context definitions, fields to assign field types to, and/or additional information. An example of configuration data 238 is illustrated in FIG. 5.

One possible data source 105A-N is a SIEM, and the raw data stream 210 sent by the SIEM may include log entries generated by the SIEM. Log entries generated by the SIEM may be based on other log entries that were originally generated by other data sources and sent to the SIEM. The SIEM may have then processed those other log entries to generate the SIEM log entries included in the raw data stream 210. In one embodiment, log entries received from SIEMs are received as a burn down list, where each SIEM log entry in the burn down list represents a particular threat, alert or incident.

For convenience the configuration data 238 is shown as being located in the event data store 165. In such an embodiment, the configuration data 238 may be managed by a configuration service on the event data store 165. Alternatively, the configuration data 238 and a configuration service may be deployed on a separate computing device that does not include the event data store 165. In other embodiments, copies of the configuration data 238 may be stored at each of the computing devices 115, 125, 145, 155, 170 discussed with reference to FIG. 1.

Source object creator 215 may create a data source object 235 for the new data source in the event data store 165. Alternatively, source object creator 215 may create the data source object 235 in a data store other than the event data store 165. For example, a separate data store may be maintained for data source objects in an embodiment. In one embodiment, to create the data source object in the event data store 165 source object creator 215 issues a command to data store interface 135 to cause the data store interface 135 to create the data source object 235. A unique data source identifier (ID) is assigned to the data source object, and may be used to identify data streams, messages, events and log entries associated with that data source object. The data source ID may be a universally unique identifier (UUID) in some embodiments.

If data source determiner 212 was able to determine the source type associated with the data source object, an identification of that source type is added to the data source object 235. This enables other components of the ECMS to later determine a log format for log entries from the data source, separate log entries from the raw data stream from that data source, parse log entries from that data source, assign field types to fields of the log entries from the data source, determine context definitions associated with the log entries, generate events for the log entries, and so on.

Data stream writer 225 creates a new raw data stream record 245 in the data lake 130 to store the raw data stream 210 from the new data source. This may include issuing a command to data store interface 135 to cause the data store interface 135 to generate the raw data stream record 245 in data store 140. Data stream writer 225 includes the data source ID (and in some instances the determined source type) in the command, and the data source ID is included in a raw data stream record ID of the raw data stream record 245. In one embodiment, the raw data stream record ID for the raw data stream record includes the data source ID as a root and an identifier of the stream type. A raw data stream record may have the format "UUID-raw". For example, if the data source ID was "firewall2", then the raw data stream record ID may be "firewall2-raw". In some instances, the source type is also identified for the raw data stream record.

Once a data source object 235 and raw data stream record 245 have been generated for a particular data source 105A-N, new data in the raw data stream 210 from that data source 235 is written to the raw data stream record 245 associated with the data source object 235. To write a raw data stream 210 to the data lake 130, data stream writer 225 may issue a write command including at least one of an appropriate data source ID or raw data stream record ID to the data store interface 135. The data store interface 135 may then write the raw data stream 210 to the raw data stream record 245 having the raw data stream record ID that matches the received raw data stream record ID or that partially matches the received data source record ID. The data lake 130 may have many raw data stream records 245, where each raw data stream record 245 includes log data from a single data source 105A-N.

In one embodiment, listener 120 splits the raw data stream 210 into equally sized data chunks or blocks. For example, the listener 120 may split the data into 10 kb blocks, 4 kb blocks, 1 Mb blocks, or blocks having other sizes. Each block may contain a number of complete log entries and may contain one or more partial log entries. Each block may be tagged with the source object ID and/or an identifier of the source type associated with the raw data stream 210. Additionally, each block may be tagged with a time stamp representing the receipt time (when the block was received from the data source). In one embodiment, the data lake 130 is a messaging system that guarantees message order. This may ensure that partial log entries that span two messages can be merged into complete log entries.

Listener 120 may send a notice to the indexer to wake the indexer and cause the indexer to begin processing log data in the raw data stream record 245 once that log data is written in the data lake 130. When data stream writer 225 writes data in a raw data stream 210 to the raw data stream record 245, data stream writer 245 may determine an amount of time that has passed since log data was previously written to the raw data stream record 245. If more than a threshold amount of time has passed (e.g., 10 minutes, 4 hours, 1 day, etc.), then listener 120 may send the notice to the indexer. In one embodiment, the data lake 130 includes a notice data stream record, and the notice is sent to the indexer by writing the notice to the notice data stream record. The notice may indicate the raw data stream record 245 that contains data to be processed. The indexer may periodically or continuously check the notice data stream record. Response to identifying a new entry in the notice data stream record, the indexer may read the entry to determine a raw data stream record having new log data to process, and may then process that new log data.

Figure 3:
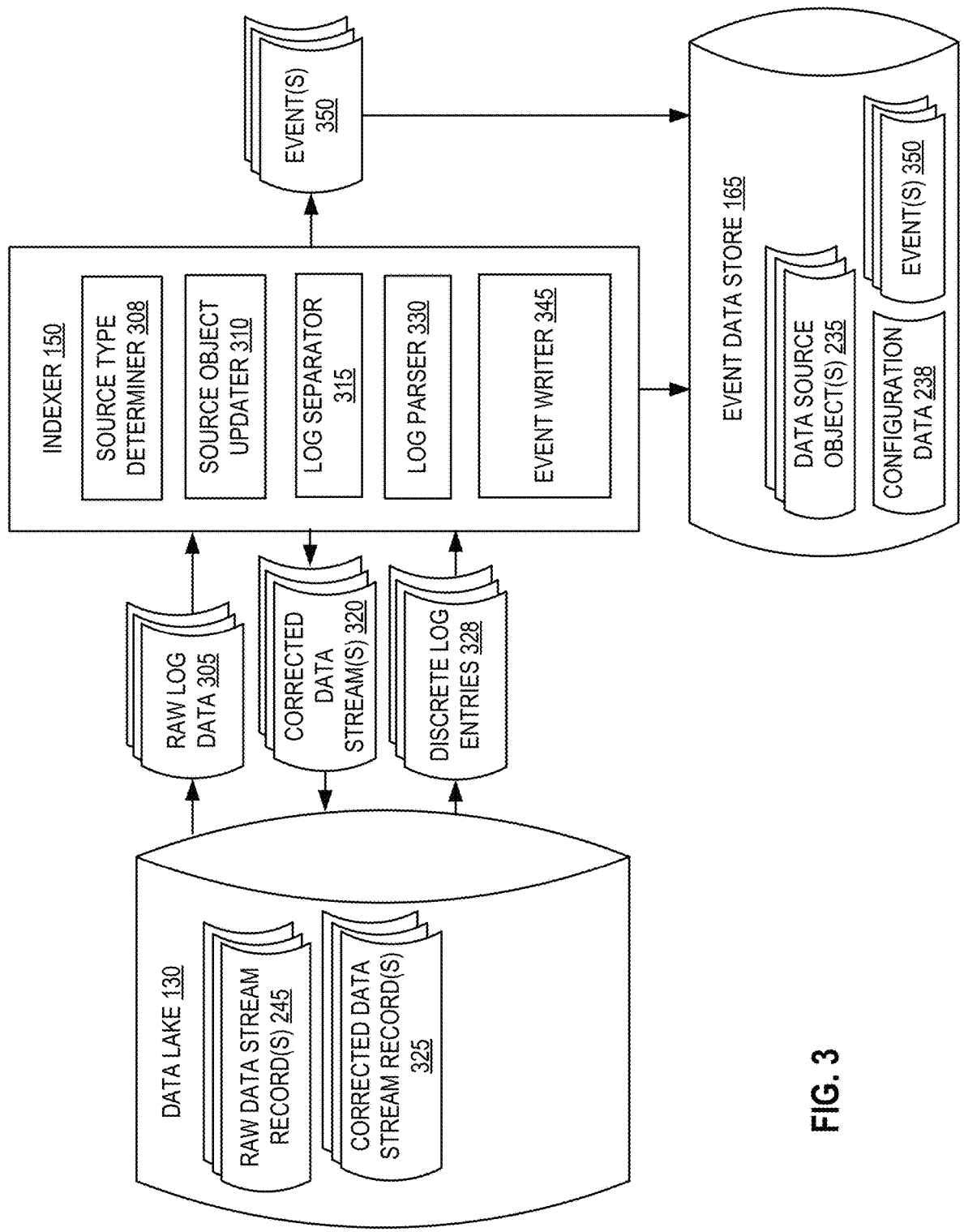
FIG. 3 is a block diagram of an indexer of an event context management system, in accordance with embodiments.

FIG. 3 is a block diagram of an indexer 150 of an event context management system. In one embodiment, indexer 150 includes a source type determiner 308, a source object updater 310, a log separator 315, a log parser 330 and an event writer 345. Alternatively, the functionality of the source type determiner 308, source object updater 310, log separator 315, log parser 330 and/or event writer 345 may be combined into a single module or divided into multiple modules. Moreover, multiple instances of the source type determiner 308, source object updater 310, log separator 315, log parser 330 and/or event writer 345 may be instantiated in indexer 150.

Log separator 315 retrieves raw log data 305 from raw data stream records in the data lake 130. The raw log data 305 may be log data having an original format that the log data had when it was initially created, or close thereto. Alternatively, the raw log data may be log data that has been minimally modified (e.g., by tagging the log data with a source ID and/or a source type). The raw log data 305 may be retrieved by issuing read commands to data store interface 135 of the data lake 130. Responsive to receiving raw log data 305, log separator 315 determines whether the source type is known for the data source object associated with the raw log data 305. In one embodiment, log separator 315 determines the data source ID associated with the raw data stream record 245 that the raw log data 305 is retrieved from, and issues a query to the event data store 165 using the data source ID. The event data store 165 may then return the data source object 235 having the data source ID and/or may return specific information about the data source object 235 (e.g., a particular source type or an indication that the source type is unknown). Alternatively, the source type or unknown source type may be identified in metadata associated with the raw log data (e.g., in a header of the raw log data).

If the source type for the data source object 235 is unknown, source type determiner 308 analyzes the raw log data 305 to attempt to determine the source type based on the contents of the raw log data 305. Based on the analysis of the raw log data, source type determiner 308 may determine information such as a file type, and may further determine a pattern in the log data and/or common elements in the log data. For example, source type determiner may identify a common header format, common fields, data type, and so on between log entries.

Source type determiner 308 may then compare the determined information, pattern and/or common elements to known log formats associated with source types. In one embodiment, source type determiner 308 compares the determined information, pattern and/or common elements to each of the log formats of source types included in configuration data 238. If the determined information, pattern, common elements, etc. match the elements of a known log format associated with a source type, then source type determiner 308 determines that the data source that originated the raw log data 305 has that source type. Source object updater 310 may then update the data source object 235 associated with the raw data stream record 245 to include an indication of the source type.

If source type determiner 308 is unable to determine the source type associated with a particular data source object 235 (and the associated raw log data 305 and raw data stream record 245), then no further action may be taken at that time. The data source determiner 308 may later analyze the raw log data 305 from the raw data stream record 245 again after more raw log data has been written to the raw data stream record 245. The additional log data may be sufficient to enable the data source determiner 308 to determine the source type of the data source from which the log data was received. This process may be repeated until the source type can be identified. In some instances, a data source may be associated with a new source type that is not reflected in the configuration data 238. In such an instance, the source type would not be determined until the configuration data 238 is updated to include that new source type.

If the source type associated with raw log data is known, then indexer 150 has information that identifies how to parse the raw log data, including information that can be used to identify the beginning and ending of discrete log entries in the raw log data 305. The raw log data 305 may include multiple messages that were received from the data source. Each message may include a part of a log entry, a full log entry, multiple full log entries, or some partial log entries and some full log entries. For example, a message may include a partial log entry at the beginning, multiple complete log entries, and then a partial log entry at the end. Log separator 315 uses the log format information from the source type associated with the raw log data to identify the borders (e.g., the beginnings and endings) of each discrete log entry in the messages. Log separator 315 then separates the raw log data 305 into well-formed discrete log entries.

Messages may be stored in the data lake 130 in the order in which they are received, may be stamped with time stamps, and may be read from the raw data stream record 245 in order based on the time stamps. If the end of a first message contains a partial log entry (e.g., the start of a log entry), then the subsequent message will contain the rest of that log entry (e.g., the end of the log entry). Log separator 315 may merge the partial log entries from two sequential messages to form a complete discrete log entry.

Log separator 315 generates a corrected data stream 320 that includes the separated discrete log entries, and writes the corrected data stream 320 to a corrected data stream record 325 in the data lake 130. The corrected data stream record 325 in one embodiment contains the data source ID and a further identifier that indicates that the corrected data stream record contains discrete log entries. In one embodiment, the corrected data stream record 325 has a label of "UUID-single". For example, if the data source ID was "firewall2", then the ID for the corrected data stream record 325 may be "firewall2-single".

Log parser 330 reads discrete log entries 328 from the corrected data stream records 325 and parses those discrete log entries 328. Responsive to receiving a discrete log entry 328, log parser 330 determines the source type associated with that discrete log entry 328. For example, log parser 330 may perform a lookup using the UUID associated with the discrete log entry to receive the data source object 235 having that UUID. The log parser 330 may then determine the source type included in the data source object 235. Alternatively, the source type may be identified in the discrete log entry 328. Log parser 330 may then use the determined source type to determine a log format of the discrete log entry based on the configuration data 238. The source type may be or include a transform that will transform particular log entries into events, which are discussed in greater detail below.

In determining the log format of the discrete log entry 328, log parser 330 may initially determine a high-level format for the discrete log entry, and then determine low level formatting of the discrete log entry 328. The high-level format may include a comma separated values (CSV) format, an extensible markup language (XML) format, a JavaScript® object notation (JSON) format, a regular expressions (REGEX) format, and so on. The low-level format may include the specific fields of the log entry and the location of those fields in the log entry. The low-level format may additionally include information on compound values of particular fields and how to separate those compound values into multiple discrete values. For example, a field might contain the values of "IP address: port." The low-level format may indicate this compound field and how to break the compound field into separate fields, one being an IP address field having the field value of "IP address" and the other being a port field having the field value of "port".

The low-level format may also include additional information on how to interpret the field values of the fields in the discrete log entry 328. For example, the data in the discrete log entry 328 may be interpreted differently depending on the field value of a specific field (or fields) in the discrete log entry 328. The configuration data 238 may further indicate how to interpret the data in the discrete log entry 328 based on the field value of the specific field.

In one embodiment, a source type may include references to additional transforms that will be used to interpret specific portions of the discrete log entry 328 and to assist in generating an event from that discrete log entry 328. Additional transforms may be included in the configuration data, and may be referenced in source types.

The source type (and in some instances the additional transforms) describe how to parse a log entry based on the high- and low-level formatting of the log entry. The source type (and in some instances the additional transforms) may further define a subset of the fields in the log entry that are to be assigned field types as well as the field types to assign to those fields. The field types identify fields that are to be used as index keys and that are to be later used as link keys for linking events during searches for events. Those fields that are not assigned field types may not be used as link keys or index keys.

Log parser 330 then generates an event based on the discrete log entry (referred to herein simply as an event, or as a standard event or a log event), where the event is a version of the discrete log entry that is annotated with additional information such as the assigned field types. In one embodiment the event includes a dictionary of key value pairs, where each key value pair in the dictionary includes a field name as the key and a field value as the value. Those key value pairs associated with fields that have been assigned field types may further include a field type value. Alternately, the field type information may be included as additional key value pairs in a field type section of the dictionary. Events additionally include a start time and potentially an end time, which may be determined from fields in the discrete log entry and represented as fields in the event.

Examples of field types that may be assigned to fields include "IP address", "MAC address", "user ID", "host ID", and so on. Each source type may indicate a different set of fields that are to be assigned field types. At any time, the source type may be updated to modify the fields that are to be assigned field types, and therefore to modify the fields that will be used as index keys and/or link keys.

Most log entries contain many fields that do not contribute useful information for determining event context, for investigating security concerns, for investigating network problems, or for other purposes. Such fields may dilute and/or obfuscate those fields that do contain useful information. By generating log events that identify those fields that contain useful information and specifying those fields for use as index keys and/or link keys, meaningful relationships between log events can be determined in queries to the event data store 165. For example, if two log events both contain the same device IP address that has been assigned an IP address field type, those two events may be linked based on that host IP address during a search, and information from both of the events may be used to determine a context surrounding the two events.

In some embodiments, each of the assigned field types has a uniform data format. Accordingly, all fields that are labeled with a particular field type will represent data in the same way. For example, for IPv6 IP addresses may be represented in numerous different ways. However, the IP address field type may specify a particular format to represent IP addresses. If a log entry uses a different format to represent an IP address, log parser 330 may invoke a transform to cause the IP address of a field associated with the IP field type to be reformatted from the different format to the particular format set forth in the IP address field type. This may ensure that matches for the same IP address will occur between events.

In other embodiments, fields having a particular field type are mapped to a particular data format. For example, all IP addresses may be mapped to an internal address format, which may be included in the configuration data. The field values may be written in their original format, but may be converted to the internal format for event context generation and queries into the event data store. This may ensure that matches for the same IP address, for example, will occur between events without actually modifying the original field values.

In some embodiments, events that are generated from SIEM log entries (e.g., that may be received in a burn down list) are treated differently from other events. Such events may be referred to as SIEM events. In one embodiment, field types are not assigned to fields of SIEM events. SIEM events may also be assigned a SIEM event ID.

Once the log parser 330 has generated an event 350 from a discrete log entry 328, event writer 345 writes that event 350 to the event data store 165. Multiple instances of a single event may be written to the event data store 165. In one embodiment, event writer 345 writes an event entry for the event 350 to the event data store 165 once for each field of that event that has an assigned field type. Each event entry for the event 350 may be indexed in the event data store 165 using the field value of a specific field of the event that has an assigned field type. In one embodiment, each event entry for the event 350 is indexed in a particular table associated with a particular field type. Each table may include a primary key corresponding to a particular field type.

SIEM events may be indexed on a SIEM event table based on the SIEM event ID of the SIEM event. Additionally, a single copy of a SIEM event is written to the event data store in some embodiments.

Events may span a period of time (e.g., may include a start time and an end time). In some embodiments, events are stored in time period partitions in the event data store (e.g., partitions that are bounded by day, by week, by hour, etc.). In such an embodiment, if an event spans multiple time periods, then that event may be written into the event data store for each partition having a time period that the event's time span overlaps. In an example, events are partitioned by day and an event starts at 11:30 PM on day 1 and ends at 12:30 AM on day 2. The example event has 4 fields that have assigned field types. In this example, the event would be written into the day 1 partition four times (once for each field having an assigned field type) and would be written into the day 2 partition four times (once for each field having an assigned field type).

In one embodiment, there is a separate event writer 345 for each field type. A particular event writer 345 may include information on how to write an event to the event data store 165 using a field value of a field having a particular field type. For example, an IP address event writer may be used to write events to the event data store 165 in a manner that indexes the event using an IP address. In one embodiment, to write an event to an event data store the event writer 345 sends an instruction to a DBMS that manages the event data store (e.g., to event data store interface 160). Thus, a separate instruction may be sent to the DBMS for each field of an event that has been assigned a field type. A user ID event writer may be used to write events to the event data store 165 in a manner that indexes the event using a user ID. Multiple different event writers may write the same event to the event data store 165.

In an example, an event may include a source IP address field having an IP address field type, a destination IP address field having an IP address field type and a port field having a port field type. The event may be indexed in an IP address field type table based on the field value of the destination IP address field, may be further indexed in the IP address field type table based on the field value of the source IP address field, and may be further indexed in a port field type table based on the field value of the port field.

In one embodiment, in which the event data store 165 is implemented on a cluster of machines, different machines in the cluster may contain different field type tables. This may distribute the load associated with searching tables between machines and improve search speeds for the event data store 165.

Figure 4:
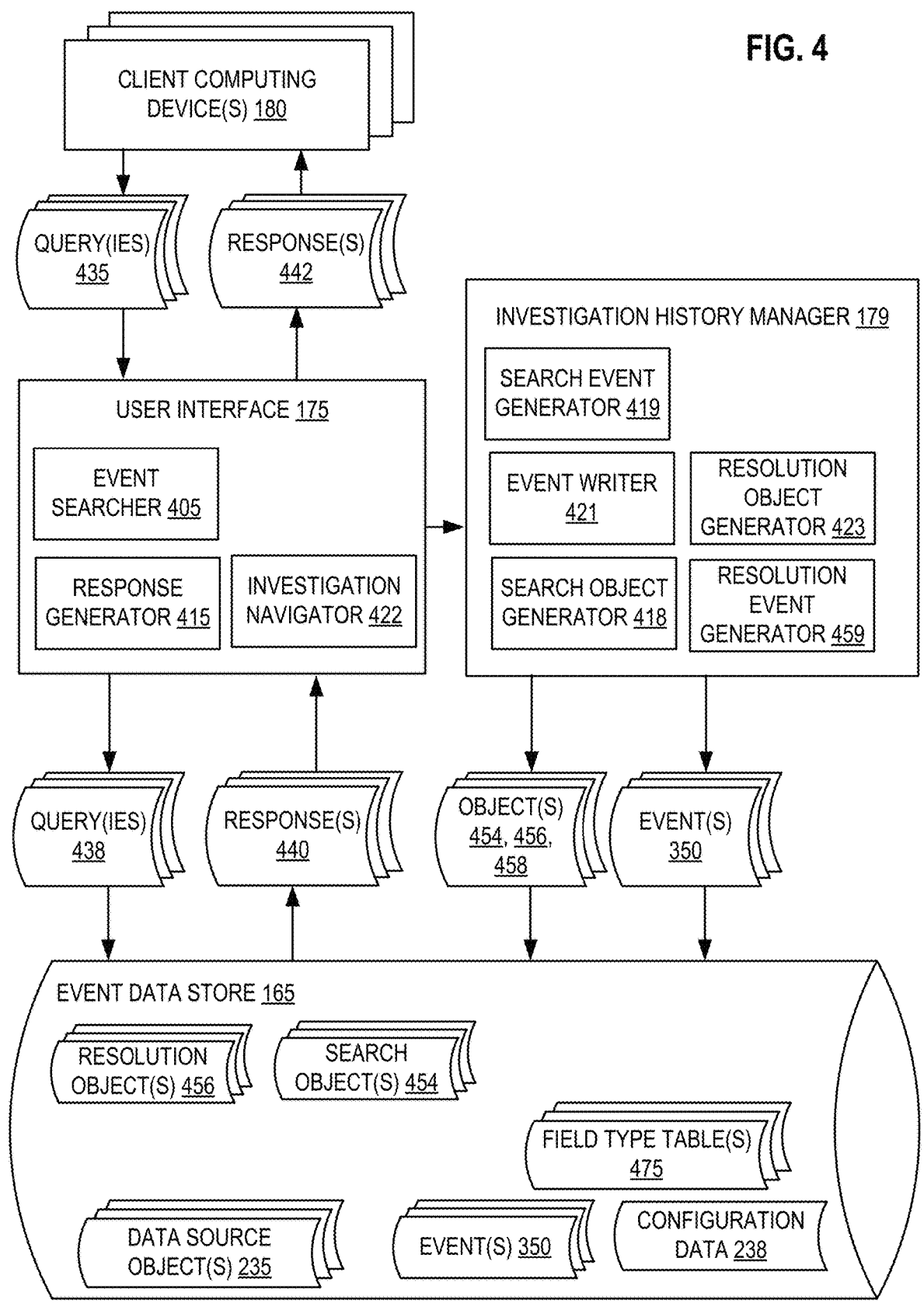
FIG. 4 is a block diagram of a user interface of an event context management system, in accordance with embodiments.

FIG. 4 is a block diagram of a user interface 175 coupled to an investigation history manager 179 of an event context management system. The user interface 175 performs the functions of receiving, acting on, and responding to queries or requests from clients. Similar operations to those described herein with reference to the user interface 175 may be performed by a service interface. User interface 175 may interface with users and provide a graphical user interface that is navigable by a user. In contrast, a service interface may interface with services such as a security event management (SEM) system, a security information management (SIM) system, a security event and information management (SIEM) system, an intrusion detection system (IDS), a user behavior analytics system (UBA), or other system. It should be understood that the discussion with reference to the user interface 175 applies equally to a service interface.

User interface 175 may be a web server that receives requests or queries 435 from client computing devices 180 (e.g., via HTTP) and sends responses 442 to those requests back to the client computing devices 180 (e.g., via HTTP). Client computing devices 180 may be desktop computers, server computers, laptop computers, tablet computers, or other types of computing devices. The client computing devices 180 may execute web browsers that interface with the user interface 175 using HTTP. Alternatively, the client computing devices 180 may execute applications that are specifically configured to interface with user interface 175.

User interface 175 receives queries 435 (also referred to as requests) from client computing devices 180. The requests may be queries or requests to issue queries to the event data store 165. A query 435 from a client computing device 180 may indicate one or more field values and a time period. The request or query may also indicate one or more fields or field types associated with the provided field values. For example, a request may indicate that a received field value is an IP address, a port, a user ID, and so on. The provided time period may be a single point in time (e.g., 1:00 PM on Mar. 15, 2014) or a time range. Time ranges may be open ended time ranges that specify just a start time or just an end time, or may be closed ended time ranges that specify both a start time and an end time. For example, a time period may be 1:00 PM to 5:00 PM on Mar. 15, 2014. Specified time periods may also be a particular day, a particular week, a particular month, and so on.

Users may be administrators or operations personnel who issue requests to user interface 175 to resolve problem tickets, investigate 422 alerts about possible problems in an enterprise's operation, and/or investigate 422 other incidents. For example, an administrator may receive a report that a network is down, that a particular employee cannot access a web server, that a network is slow, and so on. In another example, an identity management device may alert the user that a particular employee has failed to successfully log in to an account a threshold number of times, which might mean that someone is trying to brute force an entry onto a system of an enterprise.

The administrator may start with minimal information about a problem or alert, such as the particular device that generated the alert, the particular network that is experiencing a problem, a time that the problem occurred, and so on. The administrator may then issue a query to the user interface 175 that includes the known information.

In another example, a SIEM may generate an ordered list of potential threats known as a burn down list. SIEM events may have been generated and stored in the event data store 165 based on the burn down list. A list of the unresolved SIEM events may be provided to the user via the user interface 175 (or service interface). The user may then select a SIEM event and input or select field values from the selected SIEM event for a query to the user interface.

In one embodiment, the user interface 175 provides a graphical interface in which the user is able to select the SIEM event from the list of SIEM events (which may be a representation of a received burn down list), and is able to further select specific field values from the selected SIEM event to perform searches on.

Responsive to user interface 175 receiving a query 435, event searcher 405 determines one or more queries 438 to issue to the event data store 165 based on the query 435. The queries 438 may include the time period and the field value or field values that were provided in the query 435. The query or queries 438 may additionally include any other information that was provided in the query 435 (also referred to as a request), such as the field type or specific field associated with the provided field value or field values.

If no field type or field identifier was provided with the field value, event searcher 405 may analyze the provided field value to determine one or more field types that might correspond to the field value. Event searcher 405 may determine the possible field types based on comparing a format of the field value to the formats of each of the possible field types. For any field type that has a format that matches the format of the provided field value, event searcher may identify a possible match. For example, if the field value was "192.168.0.1", then the event searcher might determine that the field value has an IP address field type.

In one embodiment, if the field type of the provided field value is known, then event searcher 405 issues a query to a particular field type table 475 associated with the known field type using the field value as a key. The query additionally includes the time period indicated in the request from the client computing device. Events having one or more fields with that field type may be indexed in the field type table 475 based on the field values associated with those one or more fields. If the field type is unknown, then event searcher may issue a separate query on each of the field type tables 475 associated with field types having field value formats that match a format of the provided field value. Alternatively, event searcher 405 may issue queries to each of the field type tables 475.

Event searcher 405 receives responses 440 to the one or more queries that were issued to the event data store 165. The received responses 440 include one or more events 350 having fields that match the queried field values and a time stamp that matches the queried time period. If the time period was a range, then the returned events would have a time stamp that falls within the range. If multiple field values were provided, one or more queries 438 may be issued to event data store 165 using those field values. Queries 438 may be made to various appropriate field type tables 475, and returned responses 440 may include events 350 having all of the searched field values. Alternatively, or additionally, responses 440 may include events 350 having a subset of the searched field values.

In embodiments, events 350 include both standard or log events as described in detail above as well as search events and/or resolution events. Search events are events 350 that are added to event data store 165 when searches are performed. Search events may include all of the field values searched in a particular query as well as a time period searched. Search events are indexed in field type tables based on the field values and/or field types that were searched and the time period searched. Accordingly, responses 440 may include search events for previous searches that were made for a similar time period and similar field values. Each search event may include a reference to an associated search object 454. Search events and search objects 454 are described in greater detail below.

Resolution events are events 350 that are added to event data store 165 when an incident is resolved and/or a conclusion is reached regarding an investigation. A resolution event is similar to a search event in that it may include all of the field values searched in a particular query as well as a time period searched. In one embodiment, the main difference between a resolution event and a search event is that a resolution event is associated with a resolution object and a search object that contributed to resolution of an investigation. Resolution events are indexed in field type tables based on the field values and/or field types that were searched and the time period searched. Accordingly, responses 440 may include resolution events for previous searches that were made for a similar time period and similar field values. Each resolution event may include a reference to an associated search object 454 and/or a reference to an associated resolution object 456. Resolution events and resolution objects 456 are described in greater detail below.

Responses 442 returned to client computing devices 180 may be arranged as reports generated by response generator 415. The reports generated in embodiments provide consolidated information that may have been gathered from thousands of disparate events. The reports may be divided into separate sections based on context types such as a network context type, an endpoint context type, a threat context type, an identity context type, an identity context type, an application context type, a data context type, a search context type, a resolution context type, and so on. Each section may include summaries of the event contexts of events associated with a particular context type. The summaries may include aggregated data that combines identical or similar event contexts and further include counts of such. The summaries may, for example, identify a number of event contexts, most common event contexts, most relevant event contexts, and/or other useful information. Contexts derived from events from disparate data sources may also be combined and included in the summaries. From the report, a user may select any of the event contexts to access original log entries associated with the event contexts, to access search objects associated with search events, to access resolution objects associated with resolution events, and so on. Stored events may have many different formats, and may have original formats that may be familiar to analysts who are investigating a detected problem.

If an investigation has been resolved, then search events and resolution events that are associated with and/or reference the same search objects may be returned in responses 440. In one embodiment, response generator 415 identifies search events and resolution events that are associated with the same search objects. Response generator 415 may then remove (e.g., filter out) each of the returned search events that is associated with the same search object as a returned resolution object.

The investigation history manager 179 is responsible for enabling searches or queries to be stored in the event data store and searched in the same manner that other events 350 are searched. Investigation history manager 179 performs the functions of generating search objects 454, generating resolution objects 456, generating search events, generating resolution events, and storing each of the events 350 and objects 454, 456, 458 in the event data store 165. In one embodiment, investigation history manager includes a search event generator 419, one or more event writers 421, a resolution object generator 423, a resolution event generator 459 and a search object generator 418. Alternatively, the functionality of one or more of these modules may be combined into a single module or divided into additional modules.

One of the data sources 105A-N previously mentioned may be a SIEM that generates log entries of detected threats (also referred to as incidents or problems). The log entries may be received in a data stream as one or more burn down lists. Each of these log entries may be processed as described with reference to FIGS. 2-3 and stored in the event data store as SIEM events. A SIEM event may be generated for each log entry/incident included in a burn down list received from a SIEM. In an example, a source type associated with the SIEM data source may first be determined, a parser may be invoked to parse the incident/log entry to identify fields and field values of the incident/log entry, and so on. In some embodiments, field types are not assigned to fields of the SIEM events. Additionally, in some embodiments a SIEM event is not indexed in the event data store separately for each field value of the event that has been assigned a field type. Instead, SIEM events may be indexed in a distinct SIEM event table.

User interface 175 may present (e.g., provide to client computing devices 180) a list of SIEM events. An operator may select one of the SIEM events to investigate. Responsive to selection of a SIEM event, user interface 175 may show field values from the SIEM event that can be searched. A user can then select one or more of the field values to initiate a query 435 on.

In one embodiment, when a query 435 is received by user interface 175, user interface 175 forwards the query 435 to investigation history manager 179. A query 435 from a client computing device 180 may indicate one or more field values and a time period. The request or query 435 may also indicate one or more fields or field types associated with the provided field values. For example, a query 435 may indicate that a received field value is an IP address, a port, a user ID, and so on. The provided time period may be a single point in time (e.g., 1:00 PM on Mar. 15, 2014) or a time range. Time ranges may be open ended time ranges that specify just a start time or just an end time, or may be closed ended time ranges that specify both a start time and an end time. For example, a time period may be 1:00 PM to 5:00 PM on Mar. 15, 2014. Specified time periods may also be a particular day, a particular week, a particular month, and so on.

A query 435 from a client computing device 180 may be a selection of one or more field values from a SIEM event. The SIEM event may have been selected by an operator for investigation, and field values of the SIEM event may have been output to the client computing device 180. A user may select one or more of the field values from the SIEM event to search. Responsive to the selection, a query 435 may automatically be sent to user interface 175 that includes a time period of the SIEM event and the one or more selected field values.

Responsive to investigation history manager 179 receiving a query 435, search object generator 418 generates a new search object 454 associated with the query 435. A search object 454 is a data structure, file, or data record that includes relevant information about a query 435. A search object 454 may include a separate field for each field value included in the query 435. The fields may or may not have associated field types. The search object 454 also includes a time period that corresponds to the time period specified in the query 435. In one embodiment, the time period for the search object 454 is wider than the received time period. For example, if the received time period was a particular hour, then the time period associated with the search object 454 may be a day that includes the particular hour or a week that includes the particular hour. The time period may be a point in time or a time range. The search object 454 may also include a time stamp for the time that the query 435 was received. Additionally, a search object identifier (ID) may be assigned to a search object when the search object is created. Each search object ID may uniquely identify a search object. A search object may also include, for example, a user supplied description which may be input by a user and/or an ID of a user executing the query.

A query 435 may be based on a selection of one or more field values from a SIEM event or may be based on a user-initiated query unassociated with a SIEM event. If a query 435 is based on selection of field values from a SIEM event, a search object 454 additionally includes a reference to the SIEM event from which the query was originated. The reference may be an additional field in the search object that includes an ID of the SIEM event.

A query 435 may additionally or alternatively be based on selection of one or more events or field values from one or more events returned by a previous query. In such an instance, a search object 454 additionally includes a reference to the search object 454 associated with the previous query.

As part of an investigation (e.g., an investigation of an incident associated with a SIEM event) multiple different queries or searches may be performed. Each new search associated with a particular investigation is commonly referred to as a pivot in database parlance. A separate search object may be created by search object generator 418 for each such query, where each search object references another previously generated search object associated with a prior query whose results were used to generate a new query. Additionally, in some embodiments all of the search objects associated with a particular investigation may be assigned a common investigation identifier (ID). The investigation ID may be used to identify all of the search objects associated with a particular investigation.

Search object generator 418 writes search objects 454 to event data store 165. Search objects 454 may be indexed in the event data store 165 in a search object table in embodiments based on their search object ID.

In addition to search object generator 418 generating a search object 454 for a query, search event generator 419 generates a search event for the query. A search event is another type of event 350 that may be stored in event data store 165. A search event may be associated with a search source type and/or may be associated with a search context definition having a search context type (also referred to as a pivot context definition having a pivot context type). Similar to the search object generated for a query, the search event has fields and field values matching the fields and field values included in the query. In addition, the search event includes a reference to the search object associated with the same query as the search event. In one embodiment, the reference to the search object 454 is an additional field that includes as a field value a search object ID for the referenced search object.

Once a search event is generated, search event generator 419 invokes one or more event writers 421 to store entries for the search event (e.g., events 350) in the event data store 165. In one embodiment, an event writer 421 corresponds to event writer 345 of FIG. 3. A separate entry for the search event may be written the event data store 165 for each field value that was included in the query and that is included in the search event. Multiple instances of a single search event may be written to the event data store 165. In one embodiment, event writer 421 writes an event entry for the search event to the event data store 165 once for each field of that event that was included in an associated query. In one embodiment, each such field has an assigned field type. Each event entry for the event 350 may be indexed in the event data store 165 using the field value of a specific field of the search event. In one embodiment, each event entry for the search event is indexed in a particular table associated with a particular field type. Each table may include a primary key corresponding to a particular field type.

In one embodiment, there is a separate event writer 421 for each field type. A particular event writer 421 may include information on how to write an event to the event data store 165 using a field value of a field having a particular field type. For example, an IP address event writer may be used to write events to the event data store 165 in a manner that indexes the event using an IP address. In one embodiment, to write an event to an event data store the event writer 421 sends an instruction to a DBMS that manages the event data store (e.g., to event data store interface 160). Thus, a separate instruction may be sent to the DBMS for each field of an event that has been assigned a field type. A user ID event writer may be used to write events to the event data store 165 in a manner that indexes the event using a user ID. Multiple different event writers may write the same event to the event data store 165.

In an example, a search event may include a source IP address field having an IP address field type, a destination IP address field having an IP address field type and a port field having a port field type. The search event may be indexed in an IP address field type table based on the field value of the destination IP address field, may be further indexed in the IP address field type table based on the field value of the source IP address field, and may be further indexed in a port field type table based on the field value of the port field.

Search events may include a time period that corresponds to a searched time period and/or a time period that is wider than and includes the searched time period. The search events may have a widened time window to enable those search events to be discoverable during other searches of different time periods that surround the searched time period. This enables new searches that are performed for a particular time period to return search events associated with nearby time periods. Such nearby searches may be for similar incidents that may have been recurring, and so may be useful in diagnosing a new incident.

Search events may have associated time periods that span a time range (e.g., may include a start time and an end time). As mentioned above, the time range for a search event may be broader than an initially searched time period of a query associated with the search event. In some embodiments, events (including search events) are stored in time period partitions in the event data store (e.g., partitions that are bounded by day, by week, by hour, etc.). In such an embodiment, if a search event spans multiple time periods, then that search event may be written into the event data store for each partition having a time period that the search event's time span overlaps. In an example, events are partitioned by day and an event starts at 11:30 PM on day 1 and ends at 12:30 AM on day 2. If a searched time period from a query was a particular day, and the search event widened the time period to a week, then the search event associated with that query would be written to the event data store separately for each day. Accordingly, if the search event included 3 field values that were searched, then three entries for the search event may be written to the event data store for each of the days in the week for a total of 21 entries for the search event in the event data store.

As discussed, as part of an investigation of an incident or threat a user may issue multiple different queries, where most of the queries may be issued based on results returned from previous queries. Eventually the user may reach a conclusion about the incident or issue. For example, the user may determine that an incident is not a security breach, that an incident is a network attack, that the incident is from malware, and so on. The user may also reach a conclusion with regards to what actions to perform. Some examples of actions include performing remediation, doing nothing, reformatting software, replacing hardware, and so on. Once a conclusion has been determined, the user may issue a command to user interface 175 to generate a resolution object 456.

A resolution object 456 is a record (e.g., a data structure, file, or other arrangement of data) of a resolved and/or concluded investigation. A resolution object 456 includes information on a collection of search objects that contributed to resolution of the investigation (e.g., that were meaningful to proving something). After a user requests generation of a resolution object, user interface 175 may present the user with an investigation history showing all of the search objects for queries that were issued in association with a current investigation. The user may then select the search objects that contributed to resolution of the investigation. For example, the selected search objects may be for queries that prove a conclusion reached by the user. The user may also be prompted to input a description of the conclusion, referred to herein as resolution information. The resolution object may include references to each of the selected search objects (e.g., pointers to each of the search objects based on the search object IDs of those search objects) as well as the description of the conclusion. In addition to references to search objects and a description, a resolution object may also include a resolution object ID, a user ID of a user that generated the resolution object, a field indicating a severity of the incident associated with the resolved investigation, a field indicating whether follow-up is recommended, and so on. Additionally, the resolution object may include one or more investigation ID associated with one or more investigations for which a resolution was reached.

In some instances, a combination of investigations may lead to a particular conclusion. Accordingly, user interface 175 may enable a user to select search objects from multiple investigations to include in the resolution object. Additionally, or alternatively, a single investigation may result in multiple different conclusions. For example, a first conclusion from an investigation may be that a particular system was infected with malware and software should be reinstalled on that system. A second conclusion from the investigation may be that a particular vulnerability was discovered and that a software patch should be installed on all systems to fix the vulnerability. Accordingly, users may generate multiple resolution objects that may reference the same investigation and some or all of the same search objects as other resolution objects.

In addition to resolution object generator 423 generating a resolution object 456 for a resolved investigation, resolution event generator 459 generates multiple resolution events for the resolved investigation. A separate resolution event may be generated for each search object that is referenced in a resolution object. A resolution event is essentially the same as a search event, except that the resolution event may include a reference to the resolution object in addition to or instead of a reference to the search object associated with the resolution event. Additionally, a resolution event may be associated with a resolution source type and/or may be associated with a resolution context definition having a resolution context type. Similar to the search event generated in association with a search object, the resolution event has fields and field values matching the fields and field values included in the search object. In addition, the resolution event includes a reference to the resolution object 456. In one embodiment, the reference to the resolution object 456 is an additional field that includes as a field value a resolution object ID for the referenced resolution object.

Once a resolution event is generated, resolution event generator 459 invokes one or more event writers 421 to store entries for the resolution event in the event data store 165. A separate entry for the resolution event may be written the event data store 165 for each field value that was included in the associated search object and that is included in the resolution event. Multiple instances of a single resolution event may be written to the event data store 165. In one embodiment, event writer 421 writes an event entry for the resolution event to the event data store 165 once for each field of that event that was included in an associated search object. In one embodiment, each such field has an assigned field type. Each event entry for the event 350 may be indexed in the event data store 165 using the field value of a specific field of the resolution event. In one embodiment, each event entry for the resolution event is indexed in a particular table associated with a particular field type. Each table may include a primary key corresponding to a particular field type. Events 350 (e.g., resolution events) are shown as being written to event data store 165.

Similar to search events, resolution events may include a time period that corresponds to a searched time period and/or with a time period that is wider than and includes the searched time period. The resolution events may have a widened time window to enable those resolution events to be discoverable during other searches of different time periods that surround the searched time period. This enables new searches that are performed for a particular time period to return resolution events associated with nearby time periods.

Resolution events may have associated time periods that span a time range (e.g., may include a start time and an end time). As mentioned above, the time range for a resolution event may be broader than an initially searched time period. In some embodiments, events (including resolution events) are stored in time period partitions in the event data store (e.g., partitions that are bounded by day, by week, by hour, etc.). In such an embodiment, if a resolution event spans multiple time periods, then that resolution event may be written into the event data store for each partition having a time period that the resolution event's time span overlaps.

FIG. 5 is a block diagram of sample configuration data 238 for an event context management system. The configuration data 238 may be one or more configuration files, a configuration service, a configuration store, a configuration database, or other arrangement of configuration data. In the example of a configuration service, components off the ECMS may query the configuration service for configuration information such as data source information, source type information, context definitions, field type information, and so on. Alternatively, components of the ECMS may query the configuration service for a complete copy of the configuration data, and may store that copy of the configuration data locally. In one embodiment, no configuration service is implemented, and a copy of the configuration data 238 is stored at each component of the ECMS. In some embodiments, all components of the ECMS contain copies of the same configuration data. Alternatively, different components of the ECMS may contain configuration data with different information. For example, a listener 120 may contain just the portions of configuration data that are relevant to the listener 120, while the indexer 150 may contain just the portions of the configuration data that are relevant to the indexer 150.

In one embodiment, the configuration data 238 is implemented as one or more text files having a basic structure composed of sections, properties and values. In one embodiment, the configuration data 238 is implemented as one or more INI files. Alternatively, the configuration data 238 may be implemented as one or more extensible markup language (XML) files, JavaScript object notation (JSON) files, YAML files, comma separated values (CSV) files, or other types of configuration files.

Another example network context definition may specify the fields of source IP address, destination IP address, network address translation (NAT) source IP address, NAT destination IP address, and a rule name.

In one embodiment, configuration data 238 includes entries for source types 535 and entries for context definitions 540, 545, 550, 555, 560, 565, 580, 585, 590. Configuration data 238 may also include many other types of information, such as locations of the data lake and event data store, locations of the listener and indexer, and so on.

As shown an example source type 535 may include a title, which may indicate a class of data source, such as a Palo Alto Networks® firewall, an InfoBox® DNS firewall, a particular SIEM (e.g., Splunk®), a particular type of DNS server, and so on. A source type 535 may additionally include source identifying metadata, which may include parameters such as IP addresses, port values, URLs, file names, directory names, host names, and so forth. The source identifying information may be used by listeners to determine what source type to assign to a data source based on the source identifying metadata associated with that data source.

A source type 535 may additionally include information on a log format associated with that source type. The log format information may be used to perform operations such as breaking event data into discrete log entries, parsing discrete log entries, determining additional transforms to use to further parse discrete log entries, and so on.

The log format in a source type will indicate each of the fields included in that log format. A source type 535 may additionally include information on fields of that log format that are to be assigned specific source types as well as the specific field types to assign to those fields. For example, fields may be assigned field types such as "IP address", "port", "user ID", "host ID", and so on. The fields that are assigned field types will be used to index events associated with a particular source type into the event data store.

A source type 535 may additionally include one or more context definitions. For example, a SIEM source type may include a SIEM context definition 590. A source type 535 may include a complete context definition, including a specification of each field that is to be used as a link key to link together events. Alternatively, a source type 535 may include a context definition ID, and the context definition may be specified elsewhere in the configuration data 238. This may enable multiple different source types to reference the same context definitions without containing multiple copies of those context definitions in the configuration data.

Configuration data 238 may contain multiple different context definitions 540-565, 580-590, which may be grouped according to context type 505, 510, 515, 520, 525, 530, 570, 575, 590. A context type is a class of context (e.g., data context, application context, threat context, search context, resolution context, SIEM context, etc.), and the context definitions 540-565, 580-590 represent particular instances of a particular context type. A non-exhaustive list of context types includes an identity context type 505, an endpoint context type 510, a network context type 515, an application context type 520, a data context type 525, a threat context type 530, a search context type 570, a resolution context type 575 and a SIEM context type 590. Each context type may include multiple different context definitions. For example, identity context type 505 includes multiple identity context definitions 540, endpoint context type 510 includes multiple endpoint context definitions 545, network context type 515 includes multiple network context definitions 550, application context type 520 includes multiple application context definitions 555, data context type includes multiple data context definitions 560, and threat context type 530 includes multiple threat context definitions 565. Additionally, search context type 570 may include one or more search context definitions 580, resolution context type 575 may include one or more resolution context definitions 585 and SIEM context type may include one or more SIEM context definitions 590.

Identity context definitions 540 identify who the persons and/or machines are that are involved in events. Each identity context definition 540 is usable to associate users to at least one of devices, locations or aliases. Identity context definitions 540 will generally include specified fields of a user field, an internet protocol (IP) address field and a media access control (MAC) address field. Some identity context definitions 540 will include a source IP address and a destination IP address, a source NAT IP address, a destination NAT IP address, and/or other fields.

Each endpoint context definition 545 is usable to describe a device on a network. Information that describes the device may include information on software running on the device, a state of the device, a device type, and/or other asset information about the device. Endpoint context definitions 545 will generally include an IP address field and a host field, and may additionally include other fields.

Each network context definition 550 is usable to describe traffic across a network. The network context definition 550 may identify a network zone, a physical location, a geolocation of devices sending and receiving traffic, and so on. Network context definitions 550 will generally include at least a source IP address field, a destination IP address field and a port field.

Each application context definition 555 is usable to describe at least one of a service request or a service response. The application context definitions 555 provide, for example, information on services and applications that are being accessed from machines on a network. Application context definitions 555 will generally include at least an IP address field and a host field.

Each data context definition 560 is usable to describe content of network traffic. Data context definitions 560 describe, for example, a type of data and a volume of data that is transmitted on the network. Data context definitions 560 typically include at least a transmitted bytes field, a data encoding field and a data characterization field.

Each threat context definition 565 is usable to describe a network threat detected by a threat detector. Examples of threat detectors include an intrusion detection system (IDS), a security event and information management (SIEM) system, a user behavior analytics (UBA) system, an endpoint monitor that monitors suspicious files and processes (e.g., a malware or antivirus detection system), a configuration compliance scanner, a vulnerability scanner, and so on.

The search context definition 580 is usable to identify an event as being a search event. Unlike standard events (e.g., log events), search events are generated when a search is performed on the event data store rather than when new data is received from a raw data stream. Events identified as search events may be used to find associated search objects, determine an investigation history associated with those search objects, and so on.

The resolution context definition 585 is usable to identify an event as being a resolution event. Resolution events are generated when an investigation is concluded. Events identified as resolution events may be used to find associated search objects and/or resolution objects, determine an investigation history associated with those search objects, and so on.

The SIEM context definition 590 is usable to identify an event as being a SIEM event that is based on a threat, incident, log entry etc. received from a SIEM, such as in a burn down list.

FIG. 6 illustrates an example investigation history 600, in accordance with embodiments. As shown, the investigation history 600 is arranged as a tree having a root node (e.g., SIEM event 605), multiple leaf nodes (e.g., search objects 608, 620, 640 and 630) and intermediate nodes (e.g., search objects 610, 615, 625, 635). If an investigation is started base on a SIEM event 605, than the SIEM event 605 is considered to be the root of the investigation. If an investigation is not started from a SIEM event 605, then the very first search object that is generated for the investigation is considered to be the root of the investigation. In the illustrated example, the root node is a SIEM event 605 that triggered the investigation.

In the illustrated example, a first query was issued based on information in the SIEM event 605, and search object 608 was generated. Search object 608 includes a pointer back to the SIEM event 605.

A new query was then issued based on the information in the SIEM event 605, and search object 610 was generated. The new query may have been issued using different field values from the SIEM event 605 and may cause search object 610 to branch off from SIEM event 605. Search object 610 also includes a pointer back to the SIEM event 605. Numerous additional queries were then made, each of those queries being based on results of a previous query. As shown, search object 615 references search object 610, search object 620 references search object 615, search object 625 references search object 610, search objects 635 and 630 both reference search object 625 and search object 640 references search object 635.

A new investigation may include a query for field values and a time period that falls within or matches a time period and field values of a previous query associated with any of search objects 608-640. For example, a query of the new investigation may include field values that match searched values represented in search object 615. As a result, a search event that references search object 615 may be returned responsive to the new query. If a user selects that search event, the entire investigation history 600 may be shown as a tree structure. The user may then select any of the search objects 608-640 included in the search history 600. Responsive to the selection of a search object (e.g., search object 610), a new query may be issued based on the field values included in the selected search object. In other words, the query represented by the search object may be rerun. Accordingly, entire previous investigations may be discoverable and navigated during a current investigation.

FIG. 7 illustrates an example resolved investigation history 700, in accordance with embodiments. When an investigation is resolved and a resolution object is generated, a user may select those search objects that contributed to resolution of the investigation, referred to as conclusion contributors 705. Alternatively, the ECMS may automatically select a current leaf node of the investigation history for a current investigation, a root node of the investigation history, and all additional nodes between the leaf node and the root node. As shown, for the investigation associated with investigation history 600 SIEM event 605 and search objects 610, 625, 635, 640 contributed to an ultimate conclusion. Accordingly, the generated resolution object includes references to search objects 610, 625, 635, 640 and to SIEM event 605. If a resolution event associated with any of search objects 610, 625, 635, 640 is included in a new search result of a new query, a user may select the resolution event and the associated resolution object including the search objects and SIEM event, and the relationships between the search objects and SIEM event), may be output. The user may then select any of those search objects to recreate a previous query associated with any of the search objects or to view the SIEM event 605.

The investigation history 600 and resolved investigation history 700 are useful to understand the investigation that a previous operator performed. These investigation histories 600, 700 enable a different user or the same user to later go back and walk through the steps that were performed in the investigation. The same queries that were previously performed as part of the investigation may be recreated as the investigation history is navigated.

FIGS. 8-12 are flow diagrams showing various methods performed by an ECMS system to record queries in an event data store that also stores searched events. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by one or more computing devices that make up an ECMS (e.g., computing devices executing a user interface 175 and/or an investigation history manager 179).

Figure 8:
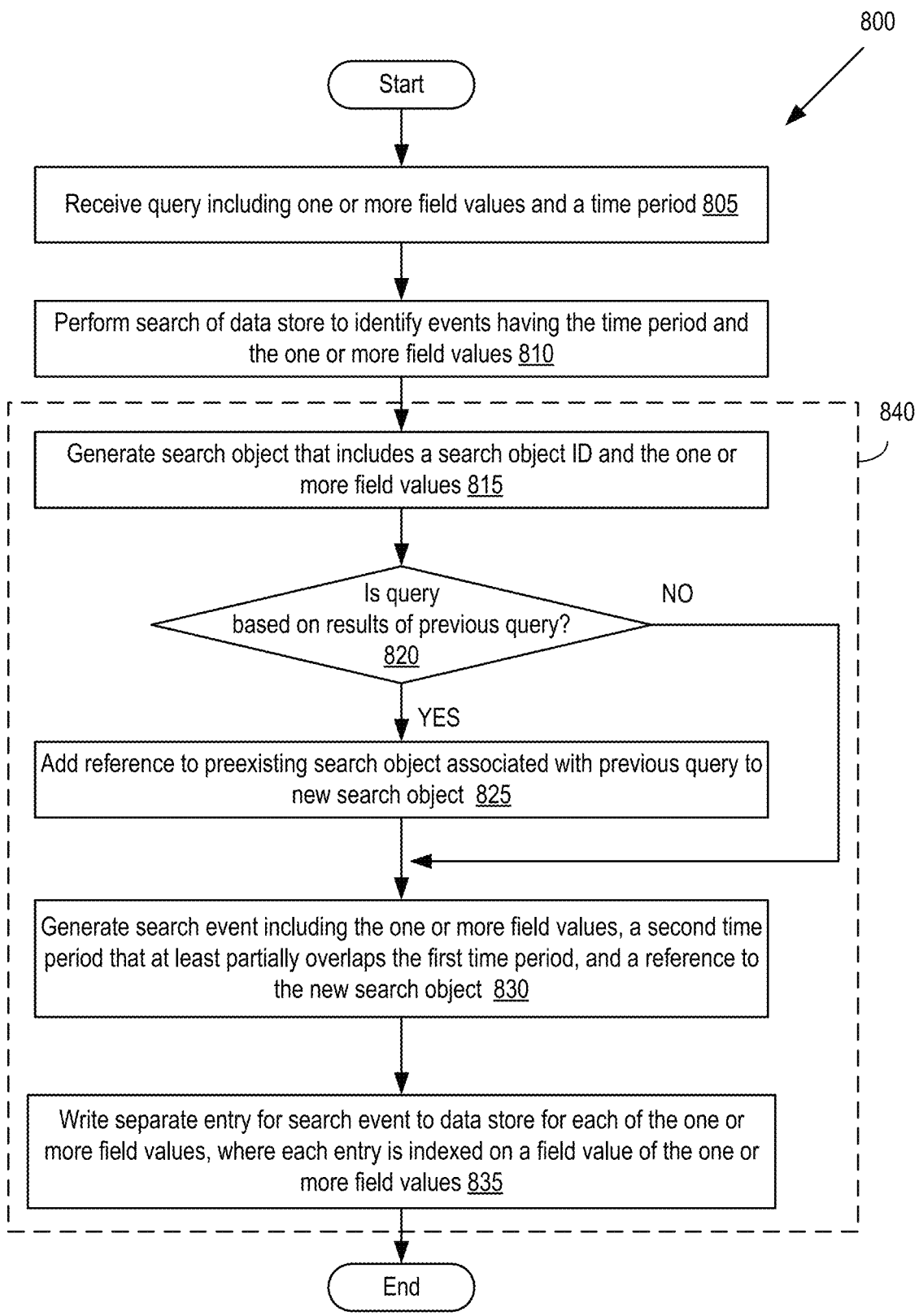
FIG. 8 is a flow chart of one embodiment for a method of searching a data store, generating search events and storing the search events in the searched data store.

FIG. 8 is a flow chart of one embodiment for a method 800 of searching a data store, generating search events and storing the search events in the searched data store. At block 805 of method 800 processing logic receives a query including one or more field values and a time period. The query may be based on field values manually input by a user or based on field values selected from a SIEM event (e.g., from a burn down list). At block 810, processing logic performs a search of a data store to identify events having the time period and the one or more field values.

At block 815, processing logic generates a search object that includes a search object ID and the one or more field values. The search object may also include a time period that corresponds to the time period specified in the received query or that is larger than the searched time period. Additionally, the search object may include other information such as a user ID of a user that initiated the query, an investigation ID of an investigation associated with the query, and so on.

At block 820, processing logic determines whether the query is based on results of a previous query. For example, a previous query may have returned an event having a particular set of field values and a time period. A user may have selected that event, and the query received at block 805 may have been based on the time period and field values in that event. If the query is based on results of a previous query, the method proceeds to block 825. Otherwise, the method proceeds to block 830.

At block 825, processing logic adds to the search object a reference to a preexisting search object associated with the previous query. The reference may be a field that includes as a field value a search object ID of the preexisting search object. In some instances, a query may be based on a SIEM event. Accordingly, at block 820 processing logic may additionally determine if the query received at block 805 is based on a SIEM event. If so, then at block 825 processing logic may add a reference to the SIEM event to the search object.

At block 830, processing logic generates a search event including the one or more fields included in the query (that are also included in the search object). The search event additionally includes the searched time period or a second time period that is larger than the first time period and overlaps with the first time period. For example, if the first time period is a particular hour of a day, the second time period may be the entire day, a week that includes the day, a month that includes the day, and so on. If the first time period is a particular day, the second time period may be a week that includes the day, a month that includes the day, and so on. By inflating the time range, future searches for similar events may be more likely to return the search event associated with the query. For example, it is common for an operator to spend considerable time investigating a SIEM event on a particular day, and then a few days or a week later be presented with a recurrence of a very similar SIEM event. The later received SIEM event may be caused by the same problem that caused the initial SIEM event. By inflating the time range for the search event, the investigator of the later SIEM event would see the search event associated with the earlier investigation of the similar SIEM event. The investigator may then be able to leverage the earlier investigation to help with the later investigation.

At block 835, processing logic writes a separate entry for the search event to the data store for each of the one or more field values that was included in the associated search object (and that was included in the query). Each entry may be indexed on a field value of the one or more field values. Each field value may then be a key for finding a particular instance of the search event in the data store. The operations of blocks 815-835 are jointly referred to as the operations of block 840.

Figure 9:
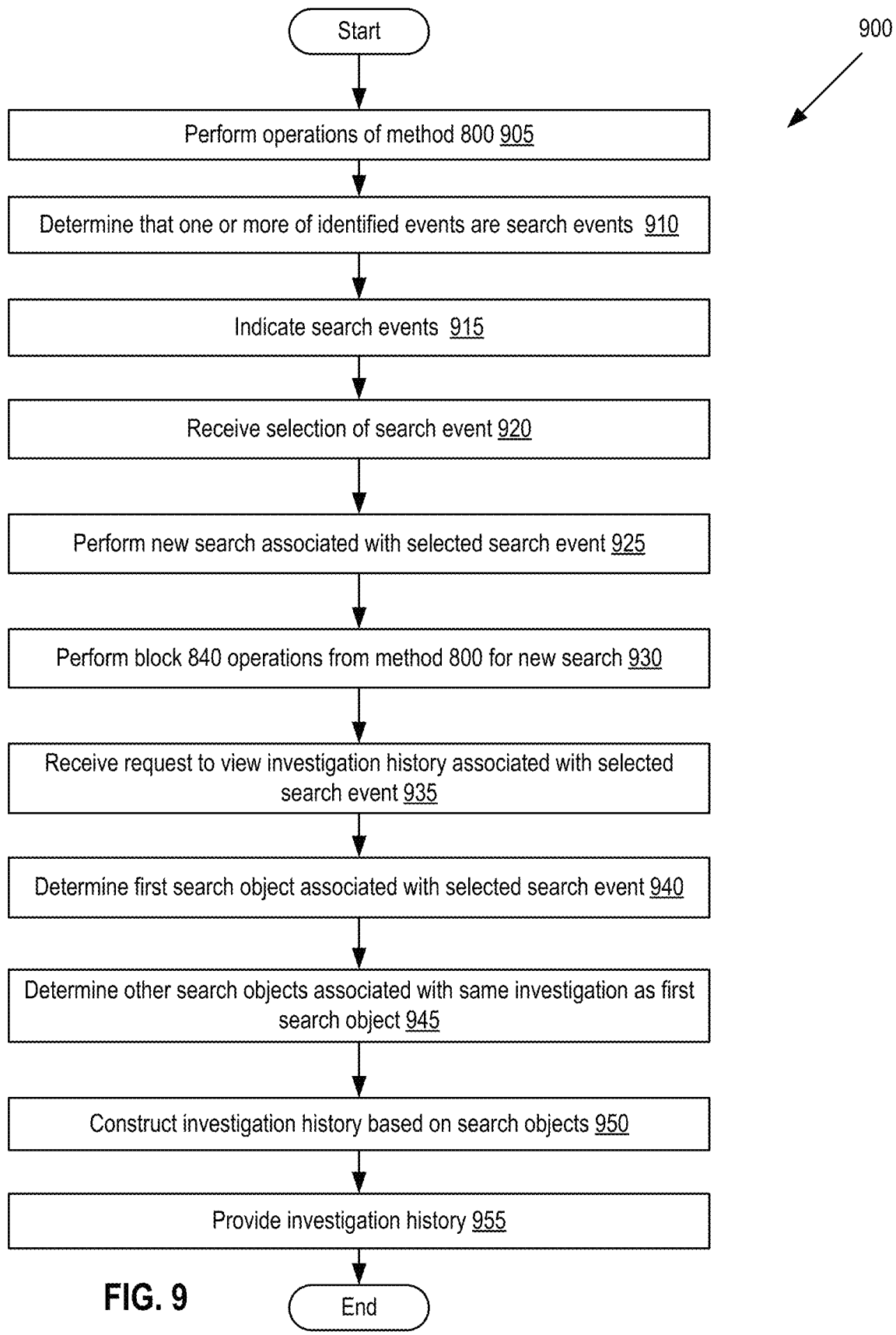
FIG. 9 is a flow chart of one embodiment for a method of searching a data store and returning search events as a result of the searching.

FIG. 9 is a flow chart of one embodiment for a method 900 of searching a data store and returning search events as a result of the searching. Method 900 begins by performing the operations of method 800. Accordingly, a query is received, a search is performed, and a search object and an associated search event may be written to an event data store. As a result of the query, multiple events are returned.

At block 910, processing logic determines that one or more of the returned events is a search event. For example, the searched time period and field values may have been previously searched in association with a previous investigation. Search objects and search events may have been generated and stored as a result of queries of the previous investigation. One or more such search events may be returned as a result of the current query.

At block 915, processing logic indicates the search events. In one embodiment, processing logic generates a report that is divided into sections based on context type. One context type that may be represented in the report is a search context type. Any returned search events may be included in the search context section of the report.

At block 920, processing logic receives a selection of a returned search event. At block 925, processing logic performs a new search or query associated with the selected search event. At block 930, the operations of block 840 from method 800 are performed for the new query. Notably, the act of selecting a search event and rerunning a query represented by that search event is itself considered to be a new query and causes a new search object and search event to be created. That new search object includes a reference to the previous search object of the previous investigation that was selected. Accordingly, a record is generated showing that a user reviewed a search object of a previous investigation as part of a new investigation.

At block 935, processing logic receives a request to view an investigation history associated with the selected search event. At block 940, processing logic determines a first search object associated with the selected search event. At block 945, processing logic determines other search objects associated with the same investigation as the first search object. At block 950, processing logic constructs an investigation history based on the search objects. Child search objects from an investigation may include pointers to parent search objects, which may in turn includes pointers to their parent search objects, and so on. Based on these relationships a tree may be constructed showing the investigation history. At block 955, processing logic provides (e.g., displays or otherwise outputs) the investigation history. In some embodiments the operations of blocks 940-955 may be performed without first receiving a request to view an investigation history.

Figure 10:
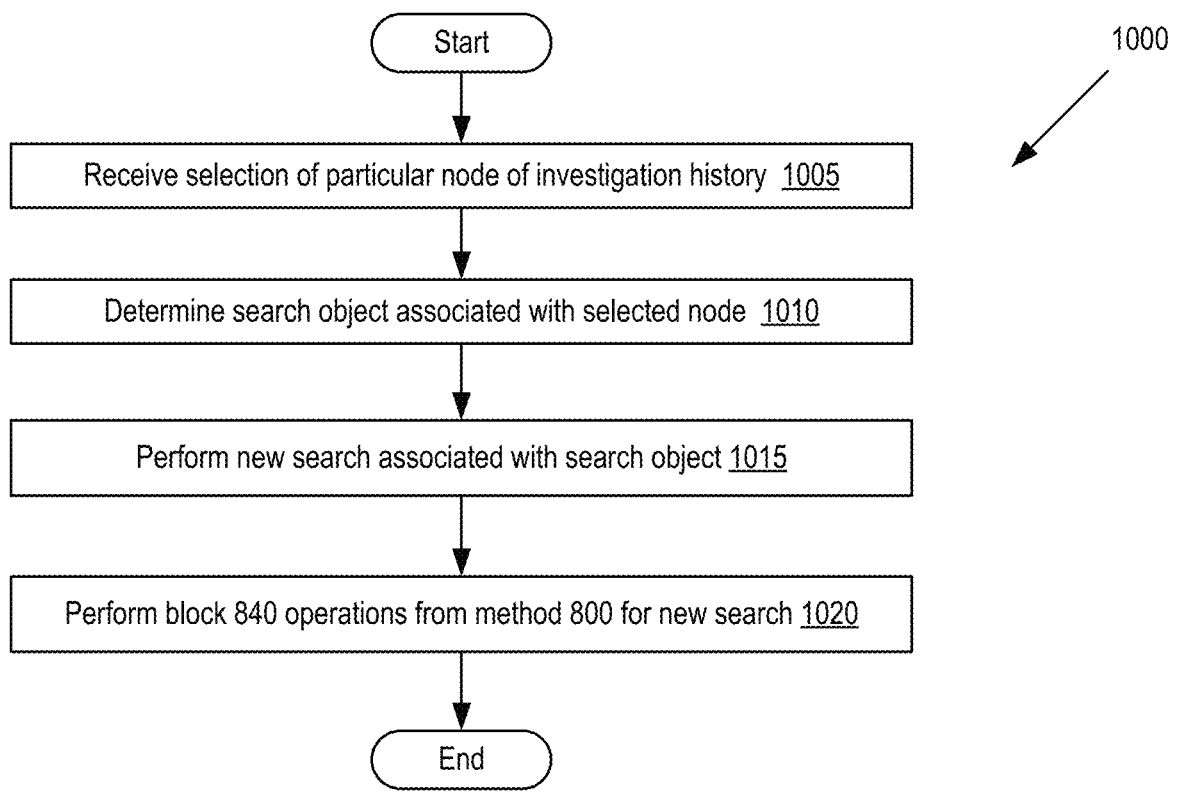
FIG. 10 is a flow chart of one embodiment for a method of navigating a previous investigation history.

FIG. 10 is a flow chart of one embodiment for a method 1000 of navigating a previous investigation history. Method 1000 may be performed after method 900 is performed in embodiments. At block 1005 of method 1000, processing logic receives a selection of a particular node of an investigation history. Each node of the investigation history may be associated with a search object. At block 1010, processing logic determines a search object associated with the selected node. At block 1015, processing logic performs a new search associated with the search object. The search object may include a time period and a set of field values that were part of a previous query. Processing logic may rerun the query having those field values and that time period, which would return the same results that were previously returned when the original query was run.

At block 1020, processing logic performs the operations of block 840 from method 800 for the new search. Accordingly, a new search object and search event are created as part of the current investigation. The new search object may include a reference to a previous search object from the same investigation. Additionally, the new search object may include a reference to the search object from the previous investigation that is associated with the selected node.

In an example, in a third investigation a user may later view a second investigation in which another user reviewed search events from a first investigation. The user may see that the other user ran a query that returned a search event associated with the previous investigation, and that the other user then selected that search event. The user may see that the other user reran the query associated with the selected search event. The user may additionally see that the other user then selected another search object associated with that first investigation, and reran a query associated with the other search object. Accordingly, the user reviewing the second investigation may follow along every step in that second investigation, and may see the intersection points with the first investigation. The user may then, if so desired, review the steps that were performed in the first investigation that intersects with the second investigation that he or she was reviewing.

Figure 11:
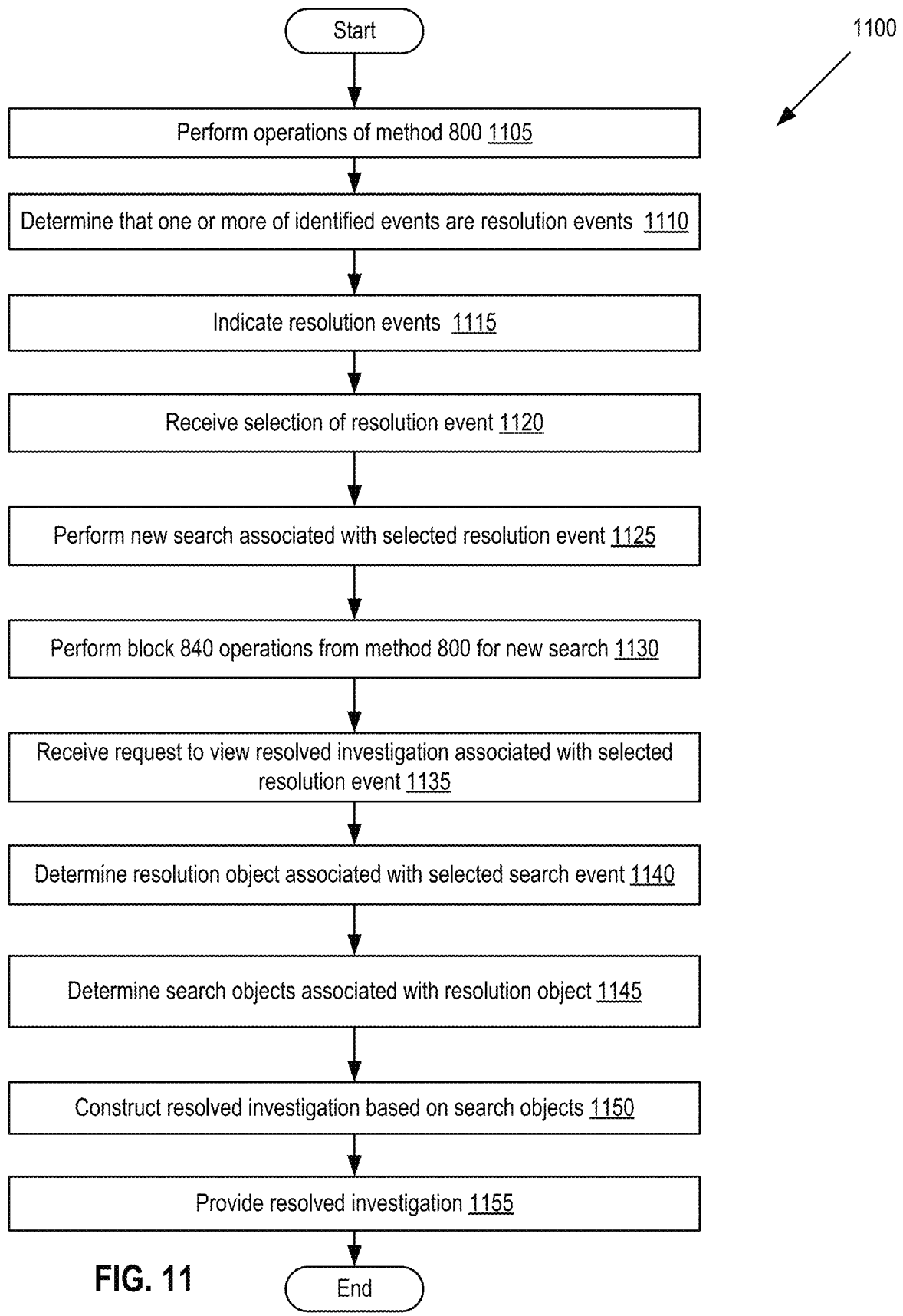
FIG. 11 is a flow chart of one embodiment for a method of searching a data store and returning resolution events as a result of the searching.

FIG. 11 is a flow chart of one embodiment for a method 1100 of searching a data store and returning resolution events as a result of the searching. Method 1100 begins by performing the operations of method 800. Accordingly, a query is received, a search is performed, and a search object and an associated search event may be written to an event data store. As a result of the query, multiple events are returned.

At block 1110, processing logic determines that one or more of the returned events is a resolution event. For example, the searched time period and field values may have been previously searched in association with a previous investigation that was resolved. A resolution object and resolution events may have been generated and stored as a result of queries of the previously resolved investigation. One or more such resolution events may be returned as a result of the current query.

At block 1115, processing logic indicates the resolution events. In one embodiment, processing logic generates a report that is divided into sections based on context type. One context type that may be represented in the report is a resolution context type. Any returned resolution events may be included in the resolution context section of the report.

At block 1120, processing logic receives a selection of a returned resolution event. At block 1125, processing logic performs a new search or query associated with the selected resolution event. At block 1130, the operations of block 840 from method 800 are performed for the new query. Notably, the act of selecting a resolution event and rerunning a query represented by that resolution event is itself considered to be a new query and causes a new search object and search event to be created. That new search object includes a reference to the previous resolution object of the previous investigation that was selected. Accordingly, a record is generated showing that a user reviewed a resolution object of a previous investigation as part of a new investigation.

At block 1135, processing logic receives a request to view a resolved investigation associated with the selected resolution event. At block 1140, processing logic determines resolution object associated with the selected resolution event. At block 1145, processing logic determines search objects associated with (e.g., referenced by) the resolution object. At block 1150, processing logic constructs a resolved investigation based on the search objects. Child search objects from an investigation may include pointers to parent search objects, which may in turn include pointers to their parent search objects, and so on. At block 1155, processing logic provides (e.g., displays or otherwise outputs) the investigation history. In some embodiments the operations of blocks 1040-1055 may be performed without first receiving a request to view a resolution object.

Figure 12:
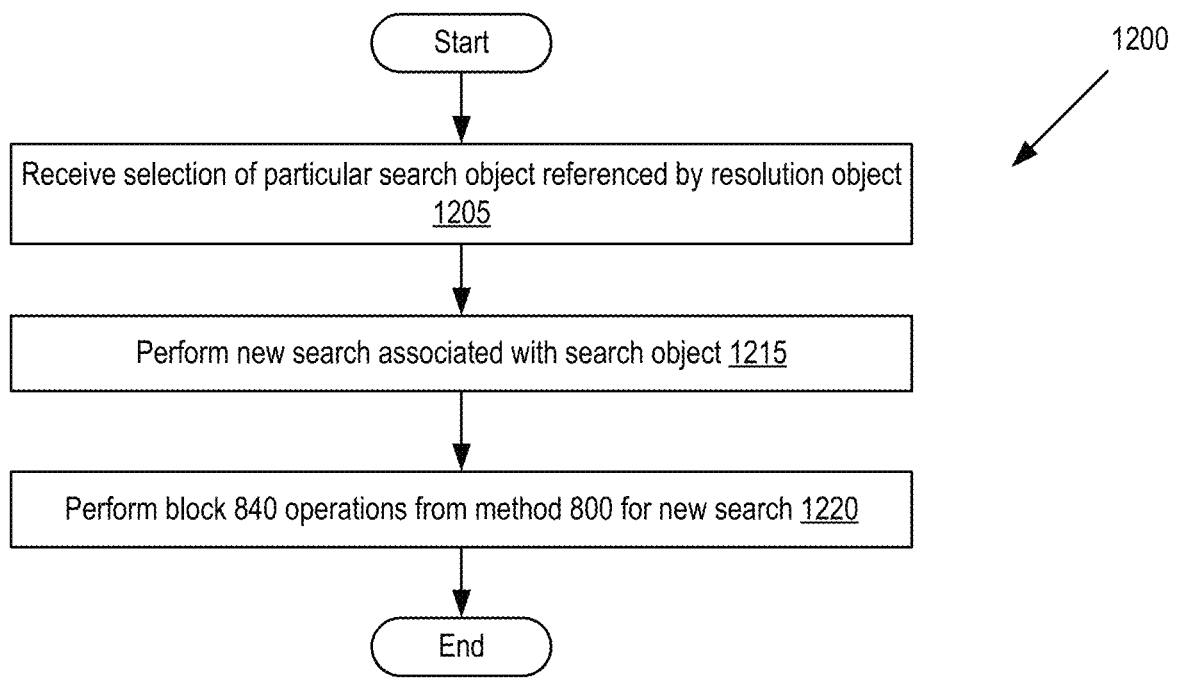
FIG. 12 is a flow chart of one embodiment for a method of navigating a previous resolved investigation.

FIG. 12 is a flow chart of one embodiment for a method 1200 of navigating a previous resolved investigation. Method 1200 may be performed after method 1100 is performed in embodiments. At block 1205 of method 1200, processing logic receives a selection of a particular search object referenced by a resolution object. The resolution object may include references to each search object that contributed to resolution of an investigation. At block 1215, processing logic performs a new search associated with the search object. The search object may include a time period and a set of field values that were part of a previous query. Processing logic may rerun the query having those field values and that time period, which would return the same results that were previously returned when the original query was run.

At block 1220, processing logic performs the operations of block 840 from method 800 for the new search. Accordingly, a new search object and search event are created as part of the current investigation. The new search object may include a reference to a previous search object from the same investigation. Additionally, the new search object may include a reference to the search object from the previous investigation that is associated with the resolution object.

Figure 13:
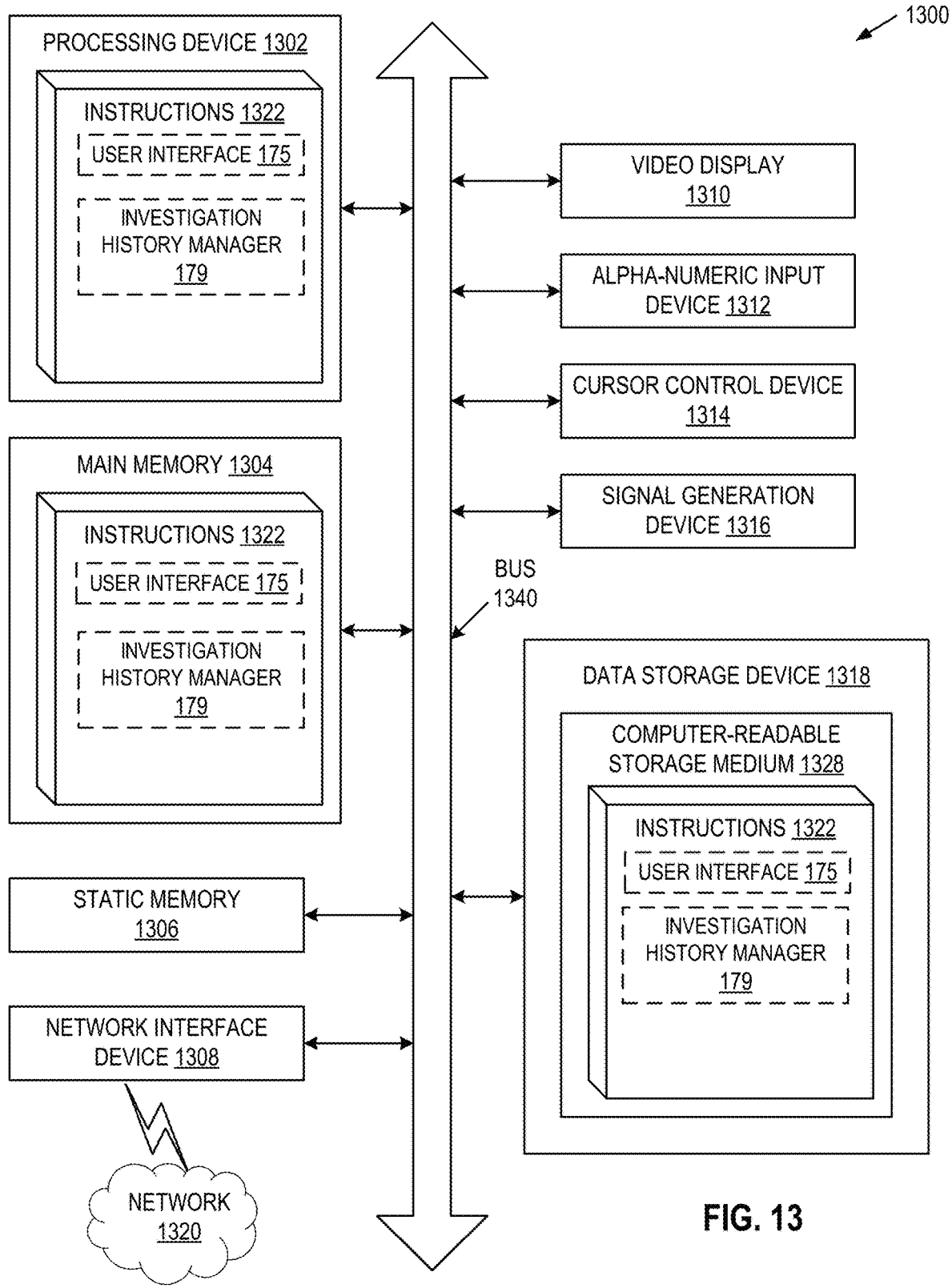
FIG. 13 illustrates a block diagram of one embodiment of a computing device.

FIG. 13 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a network 1320, such as a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a secondary memory (e.g., a data storage device 1318), which communicate with each other via a bus 1340.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1302 is configured to execute the processing logic (instructions 1322) for performing the operations and steps discussed herein.

The computing device 1300 may further include a network interface device 1308. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a machine-readable storage medium (or more specifically a computer-readable storage medium) 1328 on which is stored one or more sets of instructions 1322 embodying any one or more of the methodologies or functions described herein. The instructions 1322 may also reside, completely or at least partially, within the main memory 1304 and/or within the processing device 1302 during execution thereof by the computer system 1300, the main memory 1304 and the processing device 1302 also constituting computer-readable storage media.

The computer-readable storage medium 1328 may also be used to store a user interface 175 and/or an investigation history manager 179 (as described with reference to FIGS. 1-4), and/or a software library containing methods that call a user interface 175 and/or an investigation history manager 179. While the computer-readable storage medium 1328 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "performing", "determining", "generating", "parsing", "adding", "writing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general-purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
storing, in an event data store, store events associated with logs generated by one or more computing devices;
storing, in the event data store, search events associated with search queries submitted for querying the event store, the search queries having associated search time periods, wherein the search events are stored with corresponding stored time periods that are configurable to be equal to the search time periods and configurable to be greater than the search time periods;
receiving a query having a value for a first field and a query time period;
searching the event data store based on the value of the first field and the query time period to produce results, the results comprising:
a set of store events associated with the value of the first field and the query time period; and
a set of search events associated with the value of the first field and the query time period, wherein at least one stored time period of the set of search events is greater than the query time period, wherein the set of search events cover a range of time that is greater than the query time period to provide information beyond the requested query time period; and
causing presentation on a display of the results, the presentation providing information about the set of store events and the set of search events.

2. The method as recited in claim 1, further comprising:
generating a new search event for the received query; and
storing the new search event in the event data store.

3. The method as recited in claim 1, further comprising:
receiving an indication that one or more search events contributed to a resolution of an investigation;
generating a resolution event comprising resolution information and the one or more search events; and
storing the resolution event in the event data store.

4. The method as recited in claim 3, wherein the results further comprise at least one resolution event associated with the received query.

5. The method as recited in claim 3, further comprising:
indexing resolution events in the event data store in field type tables based on field values and field types associated with the resolution event.

6. The method as recited in claim 1, wherein a search event is a data structure, file, or data record that includes information about a query associated with the search event, the search event including a field for each field value included in the query associated with the search event.

7. The method as recited in claim 1, wherein the search events are stored in the event data store in a manner that enables the search events to be searched using a same functionality that is used to search store events.

8. The method as recited in claim 1, wherein a first store event comprises a dictionary of key value pairs, wherein each key value pair in the dictionary includes a field name as the key and a field value as the value.

9. The method as recited in claim 1, further comprising:
indexing search events in the event data store based on field values and field types associated with each search event and a time period associated with the search event.

10. The method as recited in claim 1, further comprising:
assigning a common investigation identifier to search events associated with a particular investigation, wherein the investigation identifier is used to identify the search events associated with the particular investigation.

11. A system comprising:
a memory comprising instructions; and
one or more computer processors, wherein the instructions, when executed by the one or more computer processors, cause the system to perform operations comprising:
storing, in an event data store, store events associated with logs generated by one or more computing devices;
storing, in the event data store, search events associated with search queries submitted for searching the event data store, the search queries having associated search time periods, wherein the search events are stored with corresponding stored time periods that are configurable to be equal to the search time periods and configurable to be greater than the search time periods;
receiving a query having a value for a first field and a query time period;
searching the event data store based on the value of the first field and the query time period to produce results, the results comprising:
a set of store events associated with the value of the first field and the query time period; and
a set of search events associated with the value of the first field and the query time period, wherein at least one stored time period of the set of search events is greater than the query time period, wherein the set of search events cover a range of time that is greater than the query time period to provide information beyond the requested query time period; and
causing presentation on a display of the results, the presentation providing information about the set of store events and the set of search events.

12. The system as recited in claim 11, wherein the instructions further cause the one or more computer processors to perform operations comprising:
generating a new search event for the received query; and
storing the new search event in the event data store.

13. The system as recited in claim 11, wherein the instructions further cause the one or more computer processors to perform operations comprising:
receiving an indication that one or more search events contributed to a resolution of an investigation;
generating a resolution event comprising resolution information and the one or more search events; and
storing the resolution event in the event data store.

14. The system as recited in claim 13, wherein the results further comprise at least one resolution event associated with the received query, wherein the instructions further cause the one or more computer processors to perform operations comprising:
indexing resolution events in the event data store in field type tables based on field values and field types associated with the resolution event.

15. The system as recited in claim 11, wherein a search event is a data structure, file, or data record that includes information about a query associated with the search event, the search event including a field for each field value included in the query associated with the search event.

16. A tangible machine-readable storage medium including instructions that, when executed by a machine, cause the machine to perform operations comprising:
storing, in an event data store, store events associated with logs generated by one or more computing devices;
storing, in the event data store, search events associated with search queries submitted for querying the event store, the search queries having associated search time periods, wherein the search events are stored with corresponding stored time periods that are configurable to be equal to the search time periods and configurable to be greater than the search time periods;
receiving a query having a value for a first field and a query time period;
searching the event data store based on the value of the first field and the query time period to produce results, the results comprising:
a set of store events associated with the value of the first field and the query time period; and
a set of search events associated with the value of the first field and the query time period, wherein at least one stored time period of the set of search events is greater than the query time period, wherein the set of search events cover a range of time that is greater than the query time period to provide information beyond the requested query time period; and
causing presentation on a display of the results, the presentation providing information about the set of store events and the set of search events.

17. The tangible machine-readable storage medium as recited in claim 16, wherein the machine further performs operations comprising:
generating a new search event for the received query; and
storing the new search event in the event data store.

18. The tangible machine-readable storage medium as recited in claim 16, wherein the machine further performs operations comprising:
receiving an indication that one or more search events contributed to a resolution of an investigation;
generating a resolution event comprising resolution information and the one or more search events; and
storing the resolution event in the event data store.

19. The tangible machine-readable storage medium as recited in claim 18, wherein the results further comprise at least one resolution event associated with the received query, wherein the machine further performs operations comprising:

indexing resolution events in the event data store in field type tables based on field values and field types associated with the resolution event.

20. The tangible machine-readable storage medium as recited in claim 16, wherein a search event is a data structure, file, or data record that includes information about a query associated with the search event, the search event including a field for each field value included in the query associated with the search event.

* * * * *